(12) United States Patent
Ogura

(10) Patent No.: US 8,353,495 B2
(45) Date of Patent: Jan. 15, 2013

(54) CUP HOLDER

(75) Inventor: Mitsuo Ogura, Aichi-ken (JP)

(73) Assignee: Toyoda Gosei Co., Ltd., Aichi-pref. (JP)

(*) Notice: Subject to any disclaimer, the term of this patent is extended or adjusted under 35 U.S.C. 154(b) by 253 days.

(21) Appl. No.: 12/948,849

(22) Filed: Nov. 18, 2010

(65) Prior Publication Data

US 2011/0127308 A1 Jun. 2, 2011

(30) Foreign Application Priority Data

Nov. 27, 2009 (JP) ................................ 2009-270216

(51) Int. Cl.
*A47K 1/08* (2006.01)
(52) U.S. Cl. ...................................... 248/311.2; 224/548
(58) Field of Classification Search ............... 248/311.2; 224/548, 906
See application file for complete search history.

(56) References Cited

U.S. PATENT DOCUMENTS

| | | | | |
|---|---|---|---|---|
| 4,738,423 A | * | 4/1988 | DiFilippo et al. | 248/311.2 |
| 5,398,898 A | * | 3/1995 | Bever | 248/154 |
| 5,897,090 A | * | 4/1999 | Smith et al. | 248/311.2 |
| 6,302,364 B1 | * | 10/2001 | Chiueh | 248/311.2 |
| 7,487,945 B2 | | 2/2009 | Liu et al. | |
| 2005/0072780 A1 | * | 4/2005 | Park | 220/23.8 |
| 2009/0250582 A1 | * | 10/2009 | Ziaylek | 248/312 |

FOREIGN PATENT DOCUMENTS

| JP | A-2006-224961 | 8/2006 |
|---|---|---|
| JP | A-2007-161086 | 6/2007 |
| JP | B-3991045 | 7/2007 |

* cited by examiner

*Primary Examiner* — Ramon Ramirez
(74) *Attorney, Agent, or Firm* — Posz Law Group, PLC

(57) ABSTRACT

In a non-use state where no beverage container is housed in a housing space, holding claws are urged by a ring spring to an advanced reference position where the holding claws are mostly advanced into the housing space and a bottom plate is urged by a coil spring to a highest reference position where the bottom plate is mostly moved upwardly. When a beverage container is housed in the housing space, the holding claws are pushed toward the radial outer direction of the housing space by the side surface of the beverage container, whereby the holding claws move backwardly against the urging force of the ring spring. Simultaneously, since the weight of the beverage container is applied to the bottom plate, the bottom plate moves downwardly against the urging force of the coil spring, whereby a lock member moves downwardly together with the downward movement of the bottom plate. Thus, since a restricted slanted surface abuts against the lock member, the weight of the beverage container is transmitted to a restricted vertical surface from the lock member, so that the backward movement of the holding claw is restricted.

7 Claims, 10 Drawing Sheets

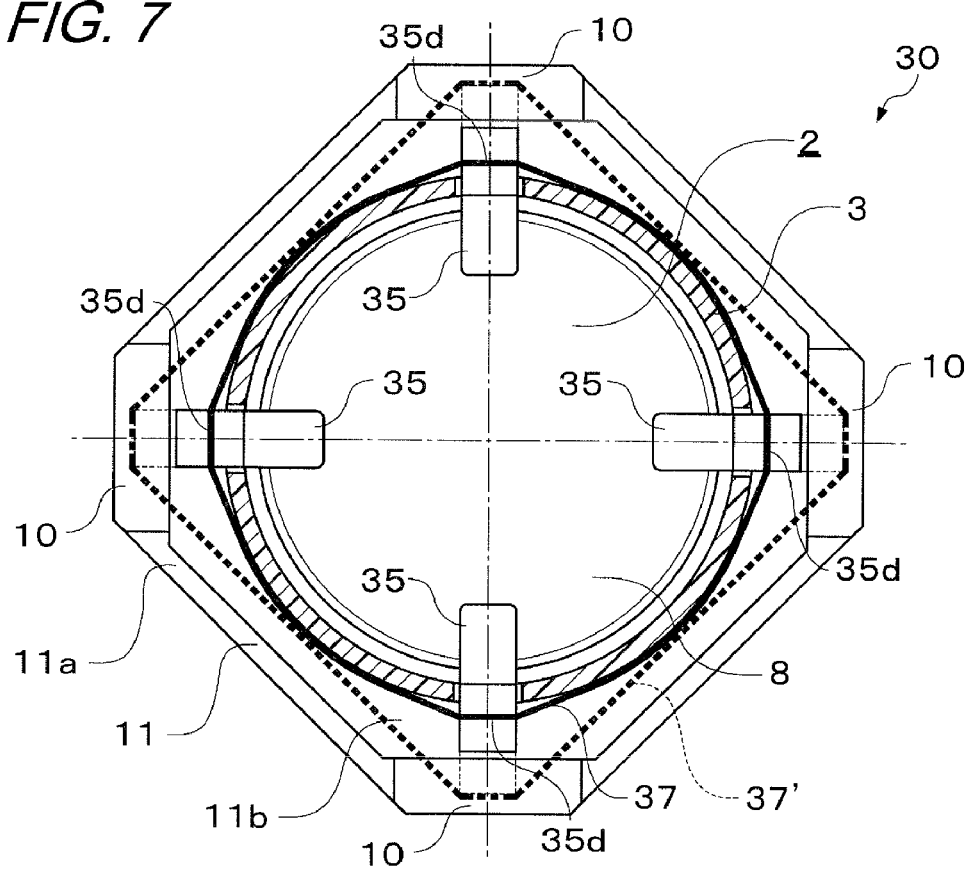

CUP HOLDER

BACKGROUND OF THE INVENTION

1. Field of the Invention

The present invention relates to a cup holder provided within the room of an automobile and, in more detail, relates to a cup holder having a holding claw capable of holding the side surface of a beverage container housed in a housing space.

2. Related Art

Cup holders each for stably holding a beverage container are provided within the room of an automobile. Many of the cup holders are provided with holding claws each for stably holding beverage containers of various sizes with respect to the acceleration and vibration of an automobile.

Such the cup holder is generally configured in a manner that the holding claw urged so as to protrude into the housing space is moved backward when the beverage container is housed within the housing space. The holding claw has the following mechanism, for example, that the holding claw has a swingable shaft at the upper portion thereof and holds a beverage container at the lower portion thereof (see Japanese Patent No. 3991045, for example), or the holding claw has a swingable shaft at the lower portion thereof and holds a beverage container at the upper portion thereof (see JP-A-2007-161086, for example), or the holding claw swings around a swingable shaft extending in the vertical direction (see JP-A-2006-224961, for example).

FIG. 10 is a sectional view explaining the structure of the cup holder described in JP-A-2007-161086. The cup holder 60 includes a cylindrical cup holder main body 62 which has a bottom portion and has a housing space 61 for housing a beverage container C, holding claws 64 each configured in a manner that the holding claw swings around a hinge portion 63 as a swingable shaft provided at the lower portion thereof and an abutment convex portion 64a provided at the upper portion of the holding claw moves respectively in the forward and backward directions to thereby move into and out of the housing space 61, and an annular rubber member 65 for urging the holding claws 64 in the direction where the holding claws 64 move forwardly.

The three holding claws 64 are provided with an equal interval so as to surround the beverage container C housed in the housing space 61 from the circumferential direction thereof (only one holding claw 64 is shown in the figure). When the beverage container C is housed in the housing space 61, since the abutment convex portions 64a are pushed by the side surface of the beverage container C, the holding claws 64 move backward to thereby hold the side surface of the beverage container C by the abutment convex portions 64a.

Since the cup holder 60 has the swingable shaft at the lower portion of each of the holding claws 64, the beverage container C can be held at the higher position of the side surface of the beverage container C as compared with the cup holder having the swingable shaft at the higher portion of each of the holding claws. The beverage container C can be held more stably as the position for holding the beverage container becomes higher.

The cup holder having such the holding claws is required not only to have holding efficiency capable of stably holding various sizes of beverage containers but also to secure usability attained by suppressing a resistance force to the minimum at the time of inserting and taking out the beverage container. In order to satisfy both the holding efficiency and the usability, usually, a pressing force (for example, $R_{60}$ in FIG. 10) for holding the side surface of the beverage container by the holding claws is set to be 1 to 5 N and the height (for example, $Y_{60}$ in FIG. 10) for holding the beverage container by the holding claws is set to be 35 to 40 mm.

According to this cup holder 60, the beverage container C can be held stably with respect to the acceleration and the vibration of an automobile in a case of housing the beverage container C of a small diameter without inclining the holding claws 64 at an advanced reference position where the holding claws 64 are mostly advanced or moved forwardly into the housing space 61 and in a case of inclining the holding claw 64 at the maximum to house and support the beverage container C of a large diameter by the inner surface of the cup holder main body 62. However, there arises a problem in the holding efficiency in a case of the container of a middle diameter in a state that the holding claw 64 slightly moves backward from the advanced reference position. This problem will be explained concretely.

In FIG. 10, when an acceleration in the horizontal direction according to the acceleration and the vibration of an automobile acts on the beverage container C toward the right direction, since an inertial force $F_{60}$ acts on the center of the gravity $G_{60}$ of the container toward the horizontal and right direction, the beverage container C is forced to be fallen down. On the other hand, since the pressing force $R_{60}$ acts on the side surface of the beverage container C in the horizontal and left direction from the portion 64a of the holding claw 64, the beverage container C is prevented from being fallen down. Supposing that a vertical distance to the center of the gravity $G_{60}$ from the bottom surface of the beverage container C is $X_{60}$ and a vertical distance the acting point of the pressing force $R_{60}$ from the bottom surface of the beverage container C is $Y_{60}$, the stability of the beverage container C is kept when a balance expression that an overturning moment ($F_{60} \times X_{60}$) is smaller than a resisting moment ($R_{60} \times Y_{60}$) is satisfied. The acceleration in the horizontal direction according to the acceleration and the vibration of an automobile sometimes becomes about 0.7 time (0.7 G) as large as the gravitational acceleration. In this case, the inertial force $F_{60}$ becomes same as $0.7 \times W_{60}$ ($W_{60}$: the weight of the beverage container C). Although the restoring moment due to the weight $W_{60}$ of the beverage container C acts to reduce the overturning moment, the restoring moment will not be taken into consideration in this case as an element for considering the dangerous side.

In the case of supposing a can of 250 ml of the standard size as the beverage container C of the small diameter, the weight $W_{60}$ of the beverage container is 2.7 N and the vertical distance $X_{60}$ is 66.5 mm. Further, in the case of supposing a condition for setting the holding efficiency of the holding claw 64 to the highest level within the related art condition, the pressing force $R_{60}$ is 5 N and the vertical distance $Y_{60}$ is 40 mm. According to these conditions, the overturning moment will be $F_{60} \times X_{60} = 0.7 \times 2.7 \text{ N} \times 66.5 \text{ mm} = 125.69$ N·mm, and the resisting moment will be $R_{60} \times Y_{60} = 5 \text{ N} \times 40 \text{ mm} = 200$ N·mm. Thus, since the overturning moment is smaller than the resisting moment, the stability of the beverage container C can be kept sufficiently.

In contrast, in the case of supposing a plastic bottle of 500 ml of the standard size as the beverage container C of the middle diameter, the weight $W_{60}$ of the beverage container is 5 N and the vertical distance $X_{60}$ is 92.5 mm. Further, as described above, in the case of supposing the condition for setting the holding efficiency of the holding claw 64 to the highest level, the overturning moment will be $F_{60} \times X_{60} = 0.7 \times 5 \text{ N} \times 92.5 \text{ mm} = 323.75$ N·mm, and the resisting moment will be $R_{60} \times Y_{60} = 5 \text{ N} \times 40 \text{ mm} = 200$ N·mm. Thus, since the overturning moment is larger than the resisting moment, the stability of the beverage container C can not be kept.

In this manner, according to the cup holder 60 of the related art, even if the condition for setting the holding efficiency to the highest level within the related art condition is taken into consideration, there arises a problem that the beverage container C of the middle diameter can not be held stably with respect to the acceleration of 0.7 G in the horizontal direction according to the acceleration and the vibration of an automobile.

Further, when the pressing force $R_{60}$ of the holding claw 64 is increased in order to improve the holding efficiency of the cup holder 60, since the resistance force at the time of inserting and taking out the beverage container C increases, good usability cannot be obtained. This problem is not peculiar to the cup holder 60 of described in the patent document 2 but common to Japanese Patent No. 3991045, JP-A-2007-161086 and JP-A-2006-224961.

Further, in the cup holder which is configured in a manner that the holding claw has the swingable shaft at the upper portion thereof and holds the beverage container at the lower portion thereof like Japanese Patent No. 3991045, when the pressing force of the holding claw is increased, the force of the holding claw for raising up the beverage container increases. Thus, when the weight of the beverage container is small due to the small amount of remaining beverage within the beverage container, the beverage container may be popped up from the cup holder. In this manner, the cup holder having the holding claws according to the related art can not sufficiently satisfy both the holding efficiency and the usability.

SUMMARY OF THE INVENTION

The invention is made in view of the aforesaid circumstances and an object of the invention is to provide a cup holder which can stably hold a beverage container with respect to the acceleration and the vibration of an automobile without increasing a resistance force at the time of inserting and taking out the beverage container.

Hereinafter, respective means suitable for solving the aforesaid problems will be explained by additionally describing functions and effects etc. according to need.

(1) The cup holder according to the invention is arranged to include a holder main body which has a bottom portion and has a housing space for housing a beverage container therein;

a holding claw which is swingable around a hinge portion as a swingable shaft provided at a lower portion of the holding claw, an upper portion of the holding claw moving into and out of the housing space;

a first urging member which urges each of the holding claws to a direction where the holding claw moves forwardly;

a bottom plate which is disposed at a lower portion of the housing space so as to be vertically movable;

a second urging member which urges the bottom plate to a direction where the bottom plate moves upwardly;

a lock member which contacts with and separates from a restricted slanted surface formed on a backward movement side of the holding claw, the lock member restricting the backward movement of the holding claw at a time of abutting against the restricted slanted surface; and a coupling member which transmits a vertical movement of the bottom plate to the lock member, wherein the restricted slanted surface inclines downwardly on the backward movement side of the holding claw, wherein in a non-use state where no beverage container is housed in the housing space, the holding claws is urged by the first urging member to an advanced reference position where the holding claw is mostly advanced into the housing space, the bottom plate is urged to a highest reference position where the bottom plate is mostly moved upwardly, and the lock member locates at a portion separated from the restricted slanted surface above the restricted slanted surface, and wherein when a beverage container is housed in the housing space, the holding claw is pushed by a side surface of the beverage container to thereby move backwardly against an urging force of the first urging member and, simultaneously, the bottom plate moves downwardly against an urging force of the second urging member since a weight of the beverage container is applied to the bottom plate to thereby move the lock member downwardly in an interlocked manner with the downward movement of the bottom plate, whereby since the restricted slanted surface abuts against the lock member, the weight of the beverage container is transmitted to the restricted slanted surface from the lock member to thereby restrict the backward movement of the holding claw.

Since the restricted slanted surface inclines downwardly on the backward movement side of the holding claw, the weight of the beverage container acts downwardly at the position of the restricted slanted surface abutting against the lock member. Simultaneously, when the weight of the beverage container is subjected to a vector transformation in accordance with the inclination angle of the restricted slanted surface, there arises a pushing force for pushing the restricted slanted surface at the abutment position with the lock member toward the advancing direction of the holding claw in the horizontal direction. The backward movement of the holding claw can be restricted by the pushing force.

The restricted slanted surface is not limited to have a constant inclination angle but may have different inclination angles toward the downward direction. For example, the restricted slanted surface may be configured to have a convex surface expanded upwardly or a concave surface caved downwardly.

According to the aforesaid configuration, the backward movement of the holding claw is restricted not only by the urging force of the first urging member but also by the transmission of the weight of the beverage container to the restricted slanted surface from the lock member. Thus, the beverage container can be held stably with respect to the acceleration and the vibration of an automobile without setting the urging force of the first urging member so as to be larger than an urging force of an urging member provided in the cup holder of the related art.

Further, in the case where an amount of beverage within the beverage container reduces and the weight thereof becomes small, an amount of load transmitted to the restricted slanted surface from the lock member also becomes small. In this state, since the position of the center of gravity of the beverage container becomes lower and an inertial force acting on the beverage container becomes smaller according to the weight of the beverage container, an overturning moment acting on the beverage container also becomes smaller. Thus, like the cup holder of the related art, the backward movement of the holding claw can be restricted only by the urging force of the first urging member.

In this manner, according to the cup holder of the invention, when the beverage container becomes empty, the beverage container can be held by the urging force of the first urging member. When the weight of the beverage container is larger, the pressing force of the holding claw can be increased in accordance with the increase of the weight of the beverage container. Thus, the beverage containers of various sizes can be housed without increasing the resistance force at the time of inserting and taking out the beverage container. Further, the beverage container can be held stably with respect to the acceleration and vibration of an automobile irrespective of the weight of the beverage container.

(2) In the cup holder according to the invention, preferably, the restricted slanted surface has a stepwise configuration where steep slanted surfaces and gentle slanted surfaces are coupled continuously in an alternative manner, and the backward movement of the holding claw is restricted when the lock member abuts against the restricted slanted surface.

As described above, when the weight of the beverage container is subjected to the vector transformation in accordance with the inclination angle of the restricted slanted surface, there arises the pushing force for pushing the restricted slanted surface at the abutment position with the lock member toward the advancing direction of the holding claw in the horizontal direction. The pushing force becomes larger as the inclination angle of the restricted slanted surface with respect to the vertical line becomes smaller, that is, as the restricted slanted surface further approaches the vertical line so as to have a steeper angle. Thus, when the restricted slanted surface is arranged to have the stepwise configuration where the steep slanted surfaces and the gentle slanted surfaces are coupled continuously in the alternative manner, and the backward movement of the holding claw is arranged to be restricted when the lock member abuts against the restricted slanted surface, the backward movement of the holding claw can be restricted effectively.

(3) In the cup holder according to the invention, preferably, a restricted vertical surface having a vertical or substantially vertical surface is formed beneath the backward movement side of the restricted slanted surface, and the abutment inner surface of the lock member locates at a height capable of abutting against the restricted vertical surface of the holding claw urged to the advanced reference position in a state where the lock member is mostly moved downwardly.

According to this configuration, when the holding claw urged to the advanced reference position moves backwardly, the restricted slanted surface abuts against the abutment inner surface of the lock member. Since the restricted vertical surface has the vertical or substantially vertical surface, the holding claw is completely restricted from further moving backwardly. The length in the vertical direction of the restricted vertical surface is not restricted in particular. Further, the restricted vertical surface may be formed at a part of a curved surface continuing from the lower end of the restricted slanted surface.

(4) In the cup holder according to the invention, preferably, the first urging member is a ring spring which is formed in a C-shape by subjecting a steel wire to a bending process, and wherein a plurality of the holding claws are provided so as to surround the beverage container housed in the housing space from a circumferential direction thereof and the ring spring is assembled so as to surround all the plurality of holding claws from the backward movement side of the holding claws.

According to this configuration, when all the holding claws are surrounded by the single ring spring, the holding claws are urged in the advancing or forward movement direction (that is, the radial inner side of the housing space). Thus, since the ring spring is cheaper as compared with other kinds of springs, the manufacturing cost of the cup holder can be reduced. Further, the assembling procedure of the first urging member can be reduced and the productivity can be improved as compared with a case where each of the holding claws is assembled with the first urging member.

As methods of assembling each of the holding claws with the first urging member, for example, there are methods of assembling a coil spring with the upper portion of the holding claw, assembling a torsion coil spring with the hinge portion at the lower part of the holding claw, and assembling a leaf spring with the lower portion of the holding claw.

(5) In the cup holder according to the invention, preferably, the first urging member is an elastic rubber ring of an annular shape, and wherein a plurality of the holding claws are provided so as to surround the beverage container housed in the housing space from a circumferential direction thereof and the rubber ring is assembled so as to surround all the plurality of holding claws from the backward movement side of the holding claws.

According to this configuration, all the holding claws are urged to the forward movement direction by surrounding all the holding claws by the single rubber ring. The rubber ring is cheaper in its cost and easier in the assembling procedure as compared with the ring spring. Thus, the rubber ring contributes to the reduction of the manufacturing cost and the improvement of the productivity.

In the case of using the ring spring described in (4) as the first urging member, since a portion of the ring spring between the adjacent holding claws expands in a circular shape toward the radial outer side of the housing space, the expanded portion of the ring spring may impede the procedure of disposing the cup holder in the narrow space. On the contrary, in the case where the rubber ring is used as the first urging member, the adjacent holding claws are coupled by the rubber ring in a straight manner with the shortest distance. Thus, since a portion of the rubber ring between the adjacent holding claws does not expand toward the radial outer side of the housing space, the cup holder can be easily disposed in the narrow space.

(6) In the cup holder according to the invention, preferably, a plurality of the holding claws are provided so as to surround the beverage container housed in the housing space from a circumferential direction thereof, the first urging member is a polygonal ring which is formed in a polygonal shape by subjecting a steel wire to a bending process so as to have torsion spring portions which number is same as the holding claws, each of the torsion spring portions is configured by two bent portions each having substantially same height as the hinge portion and disposed respectively on both sides of the hinge portion, two arm portions respectively extending upwardly from the bent portions, and an apex portion for coupling tip ends of the arm portions, the polygonal ring is formed as a flat plane area, in a plan view, surrounded by the apex portions and lines each for coupling end portions of the adjacent apex portions with a shortest distance, the polygonal ring being assembled with all the holding claws in a manner that the apex portions respectively abut against the backward movement sides of the holding claws, and when the apex portion of the torsion spring portion is pushed toward the backward movement side of the holding claw, each of the arm portions swings toward the swinging direction of the holding claw, whereby since each of the arm portions and/or each of the bent portions are twisted, an elastic force for restoring the apex portion is generated at each of the arm portions and/or each of the bent portions on the forward movement direction side of the holding claw.

According to this configuration, since all the holding claws are surrounded by the single polygonal ring to thereby urge the holding claws toward the forward movement direction. Thus, since the polygonal ring is cheaper as compared with other kinds of springs, the manufacturing cost of the cup holder can be reduced. Further, the assembling procedure of the first urging member can be reduced and the productivity can be improved as compared with a case where each of the holding claws is assembled with the first urging member.

Since the polygonal ring is formed by a steel wire, the polygonal ring is more excellent in the durability as compared with the rubber ring described in (5) which deteriorates with age. Further, since the polygonal ring is configured not in a circular shape but in a polygonal shape where the expansion degree is suppressed, in a plan view, the polygonal ring is effective for saving the space like the rubber ring described in (5). Furthermore, since the polygonal ring has torsion spring portions which are provided independently and which number is same as the holding claws, it is possible to uniformize the urging forces acting on the respective holding claws unlike the ring spring described in (4) which differs in the expandable degree in the radial direction at the respective parts in the circumferential direction thereof.

(7) In the cup holder according to the invention, preferably, the holding claw is made of resin and the hinge portion of the holding claw is an integral hinge.

Since the holding claw is made of resin, when the hinge portion of the holding claw is formed as an integral hinge which is simultaneously formed by the injection molding of the holding claw, the manufacturing cost of the cup holder can be reduced and the productivity thereof can be improved to a large extent.

Further, in the case of disposing a plurality of the holding claws at the cup holder, the plurality of holding claws may be raised from a base portion made of resin via integral hinges, respectively, for example. In this case, the base portion, the holding claws and the integral hinges can be formed integrally, whereby the manufacturing cost of the cup holder can be reduced and the productivity thereof can be further improved to a large extent.

EFFECTS OF THE INVENTION

According to the cup holder of the invention, beverage containers of various sizes can be housed without increasing a resistance force at the time of inserting and taking out a beverage container. Further, the beverage container can be held stably with respect to the acceleration and vibration of an automobile irrespective of the weight of the beverage container.

BRIEF DESCRIPTION OF THE DRAWINGS

FIGS. 1A and 1B are figures showing the structure of a cup holder according to the first embodiment, wherein FIG. 1A is a sectional view of the cup holder cut along a line B-B in FIG. 1B and FIG. 1B is a sectional view of the cup holder cut along a line A-A in FIG. 1A.

FIG. 7 is a plan view for explaining the structure of a cup holder according to the third embodiment.

FIGS. 8A and 8B are figures showing the structure of a cup holder according to the fourth embodiment, wherein FIG. 8A is a sectional view of the cup holder cut along a line B-B in FIG. 8B and FIG. 8B is a sectional view of the cup holder cut along a line A-A in FIG. 8A.

FIGS. 9A and 9B are figures showing the structure of a cup holder according to the fifth embodiment, wherein FIG. 9A is a sectional view of the cup holder cut along a line B-B in FIG. 9B and FIG. 9B is a sectional view of the cup holder cut along a line A-A in FIG. 9A.

DETAILED DESCRIPTION OF THE PREFERRED EMBODIMENTS

First Embodiment (1) Configuration of Cup Holder 1

Figure 1A:
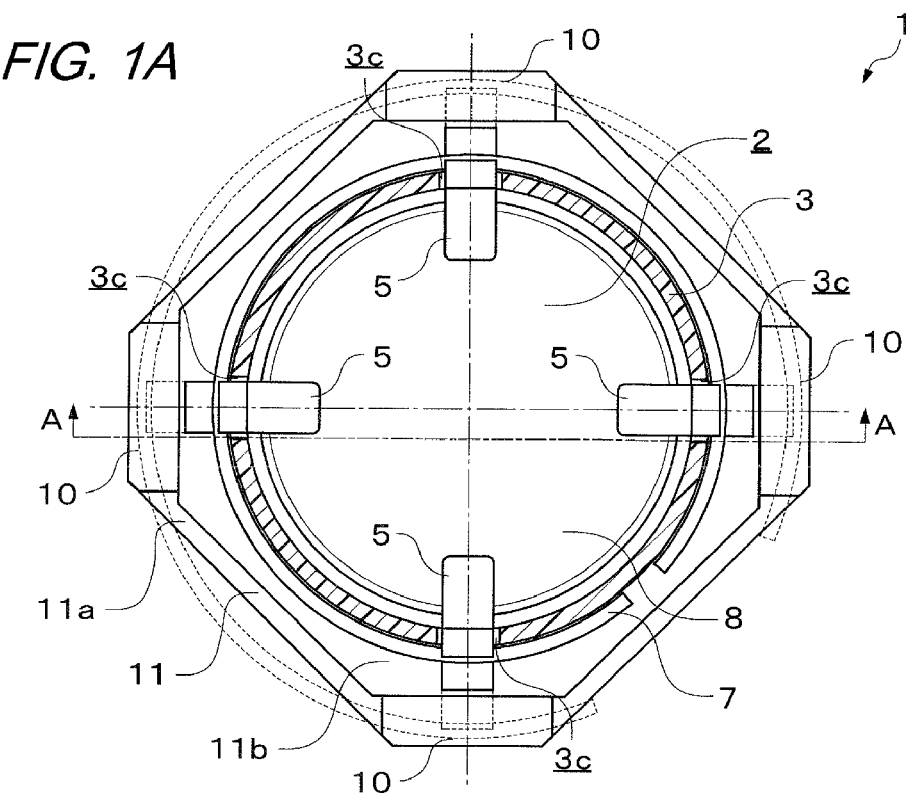
Figure 1B:
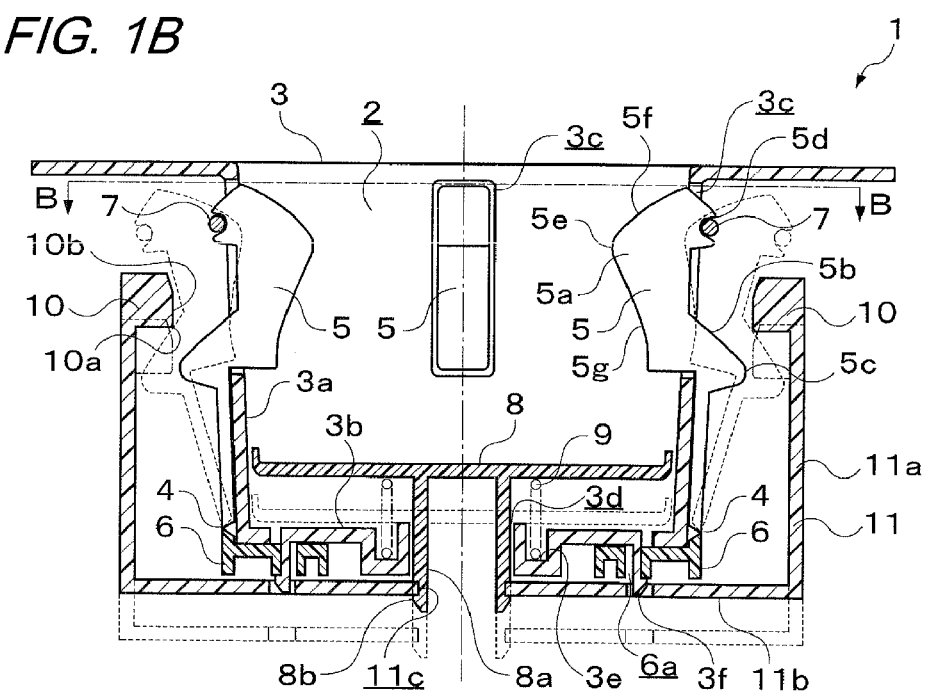

FIGS. 1A and B are figures showing the structure of a cup holder according to the embodiment. FIG. 1A is a sectional view of the cup holder cut along a line B-B in FIG. 1B, and FIG. 1B is a sectional view of the cup holder cut along a line A-A in FIG. 1A. Dotted lines in FIGS. 1A and 1B show the maximum movable ranges of respective components constituting the cup holder 1.

The cup holder 1 according to the embodiment includes a cylindrical cup holder main body 3 which has a bottom portion and has a housing space 2 for housing a beverage container, holding claws 5 each configured in a manner that the holding claw is swingable around an integral hinge 4 (hinge portion) provided at the lower portion thereof as a swingable shaft and the upper portion of the holding claw moves respectively in the forward and backward directions to thereby move into and out of the housing space 2, and a ring spring 7 (first basing member) for urging the holding claws 5 in the direction where the holding claws 5 move forwardly.

Further, the cup holder 1 includes a bottom plate 8 disposed beneath the housing space 2 so as to be able to freely move vertically, a coil spring 9 (second basing member) for urging the bottom plate 8 in the direction where the bottom plate 8 moves upwardly, lock members 10 each of which contacts with and separates from a restricted slanted surface 5b formed on the backward movement side of the holding claw 5 and restricts the backward movement of the holding claw 5 when abutted against the restricted slanted surface, and a coupling member 11 which transmits the vertical movement of the bottom plate 8 to the lock members 10.

The cup holder main body 3 is made of resin and formed by the injection molding. The cup holder main body 3 is configured in a cylindrical shape and has a side wall 3a and a bottom wall 3b for closing the lower end thereof. A space formed by the side wall 3a and the bottom wall 3b forms the housing space 2 for housing a beverage container therein. A beverage container is inserted from the upper direction of the housing space 2.

The inner diameter of the side wall 3a is set to be slightly larger than the outer diameter of a beverage container having the maximum diameter to be housed in the housing space 2 and is made gradually smaller toward the lower portion from the upper portion of the housing space 2. Four opening portions 3c are formed with the same interval above the side wall 3a so as to surround a beverage container housed in the housing space 2 from the circumferential direction thereof.

An abutment convex portion 5a of the holding claw 5 described later is disposed at each of the opening portions 3c.

A sliding hole 3d for holding a slidable shaft 8a, described later, formed at the bottom plate 8 so as to be slidable therealong is provided at the center of the bottom wall 3b. A groove portion 3e for attaching the coil spring 9 therein is formed so as to surround the sliding hole 3d. An engagement claw 3f for attaching a base portion 6, described later, integrally formed with the holding claw 5 to the cup holder main body 3 is protrusively formed at the lower surface of the bottom wall 3b.

The four holding claws 5 are disposed with the same interval so as to surround a beverage container housed in the housing space 2 from the circumferential direction thereof and are attached so as to face the housing space 2 from the opening portions 3c of the cup holder main body 3, respectively. Each of the holding claws 5 is made of resin and raised from the end portion of the base portion 6 via the integral hinge 4. The base portion 6, the holding claw 5 and the integral hinge 4 are integrally formed by the injection molding.

The integral hinge 4 is a thin thickness portion for coupling the holding claw 5 to the base portion 6 so as to be swingable freely. The integral hinge can be bent easily since the thickness of the resin is small.

The holding claw 5 is coupled at the lower end thereof to the integral hinge 4 and swings around the integral hinge 4 as a swingable shaft, whereby the abutment convex portion 5a provided at the upper portion of the holding claw moves into and moves out of the housing space 2. On the backward movement side at the center portion in the vertical direction of the holding claw 5, there are provided with the restricted slanted surface 5b and a restricted vertical surface 5c which abut against the lock member 10 to thereby restrict the backward movement of the holding claw 5. An attachment groove 5d for attaching the ring spring 7 therein is formed on the backward movement side at the upper portion of the holding claw 5.

The abutment convex portion 5a acts to hold the side surface of a beverage container and has a shape expanded on the forward movement side. The abutment convex portion 5a is inserted into the opening portion 3c of the cup holder main body 3 from the outside direction of the cup holder main body 3. The side surface of the abutment convex portion 5a is configured in a manner that a slanted surface on the upper side from an apex 5e mostly expanded on the forward movement side forms a convex surface 5f slightly expanded and a slanted surface on the lower side from the apex 5e forms a concave surface 5g slightly caved. In a state where the holding claws 5 are urged to an advanced reference position where the holding claws 5 are mostly advanced or moved forwardly into the housing space 2, a distance between the opposed apexes 5e of the abutment convex portions 5a is slightly larger than the outer diameter of a beverage container of the minimum diameter housed in the housing space 2.

The restricted slanted surface 5b and the restricted vertical surface 5c are formed as a part of the side surface of a cam-shaped convex portion expanded on the backward movement side. The restricted slanted surface 5b forms a slanted surface slanted downwardly on the backward movement side of the holding claw 5. The portion 5c is a vertical surface which is formed at a portion of a curved surface continuing from the lower end of the restricted slanted surface 5b and located on the most backward movement side of the holding claw 5.

The base portion 6 is made by resin and has a hollow circular flat shape. The base portion 6 is provided with an engagement hole 6a which engages with the engagement claw 3f protrusively formed at the lower surface of the bottom wall 3b of the cup holder main body 3. The base portion 6 can be attached to the lower surface of the bottom wall 3b without using screws or adhesive by engaging the claw 3f with the engagement hole 6a.

The ring spring 7 is formed by bending a music wire in a C-shape. The ring spring 7 is fitted into the attachment groove 5d for attaching the ring spring that is formed on the backward movement side at the upper portion of the holding claw 5, whereby the ring spring is assembled with all the holding claws, that is, the four holding claws 5 so as to surround all the holding claws 5 from the backward movement side of the holding claws 5. In a non-use state where no beverage container is housed in the housing space 2, the holding claws 5 are urged by the ring spring 7 to the advanced reference position where the holding claws 5 are mostly advanced into the housing space 2. When a beverage container is housed in the housing space 2, the holding claws 5 are pushed toward the radial outer side in the housing space 2 by the side surface of the beverage container. Thus, the holding claws 5 move backwardly against the urging force of the ring spring 7, whereby a pressing force of 5 N acts on the side surface of the beverage container via the holding claws 5 by the urging force of the ring spring 7.

The bottom plate 8 is made of resin and formed by the injection molding. The bottom plate 8 has a disc shape and is provided with a rising portion at the outer circumferential periphery thereof. The outer diameter of the bottom plate 8 slightly smaller than the inner diameter of side wall 3a of the cup holder main body 3. The bottom plate 8 is disposed at the lower portion of the housing space 2 so as to vertically move freely. The elevating distance of the bottom plate 8 is 8 mm. In a state where the bottom plate 8 is urged to a highest reference position where the bottom plate is mostly moved upwardly, a holding height (a vertical position to the apex 5e (holding point) of the abutment convex portion 5a of the holding claw 5 from the upper surface of the bottom plate 8) is 40 mm. The holding height in a state where the bottom plate 8 is mostly moved downwardly is 48 mm.

The slidable shaft 8a extending downwardly is integrally formed with the bottom plate at the center portion of the lower surface of the bottom plate 8. The slidable shaft 8a is slidably held within the sliding hole 3d formed at the bottom wall 3b of the cup holder main body 3. An engaging claw 8b is formed at the lower end of the slidable shaft 8a so as to be able to engage with an engagement hole 11c formed at the horizontal coupling portion 11b, described later, of a coupling member 11.

The coil spring 9 is attached between the groove portion 3e formed at the center of the bottom wall 3b of the cup holder main body 3 and the lower surface of the bottom plate 8. In a non-use state where a beverage container is not housed in the housing space 2, the bottom plate 8 is urged by the coil spring 9 to the highest reference position where the bottom plate 8 is mostly moved upwardly. The urging force of the coil spring 9 is 1 N.

The four lock members 10 are respectively disposed at positions corresponding to the holding claws 5 with the same interval so as to surround a beverage container housed in the housing space 2 from the circumferential direction thereof. The lock members 10 are made of resin and integrally formed with the coupling member 11 by the injection molding.

Each of the lock members 10 has an almost rectangular shape in section having a horizontal plane and a vertical plane. The lower end of the lock member on a side facing the holding claw 5 forms an abutment corner portion 10a capable of abutting against the restricted slanted surface 5b, and a vertical surface at the upper portion of the abutment corner portion 10a forms an abutment inner surface 10b capable of abutting against the restricted vertical surface 5c.

The coupling member 11 acts to transmit the vertical movement of the bottom plate 8 to the lock members 10 and includes a vertical coupling portion 11a of a rectangular cylindrical shape and the horizontal coupling portion 11b of a plate shape for covering the lower end of the vertical coupling portion 11a. The lower surfaces of the lock members 10 are respectively coupled to the upper ends of the corner portions of the vertical coupling portion 11a. The engagement hole 11c formed at the center of the horizontal coupling portion 11b engages with the engaging claw 8b formed at the lower end of the slidable shaft 8a of the bottom plate 8, whereby the bottom plate 8 is coupled with the coupling member 11.

As described above, since the lock members 10 and the bottom plate 8 are integrated via the coupling member 11, the lock members 10 move vertically in an interlocked manner with the vertical movement of the bottom plate 8. In the non-use state where a beverage container is not housed in the housing space 2, since the bottom plate 8 is urged by the coil spring 9 to the highest reference position, the lock members 10 are also located at the position where the lock members are mostly moved upwardly. In this state, each of the lock members 10 is located at the position away from the restricted slanted surface 5b above the restricted slanted surface 5b.

(2) Operation and Effects of Cup Holder 1

Next, the explanation will be made as to the operation and effects of the cup holder 1 at the time of housing a beverage container within the housing space 2. The dotted lines in FIGS. 1A and 1B show the maximum movable ranges of the respective components constituting the cup holder 1. Each of the holding claws 5 can move backwardly to the position shown by a dotted line from the advanced reference position shown by a steady line due to the swinging operation thereof. The diameter of the ring spring 7 expands to a position shown by dotted lines in accordance with the backward movement of the holding claws 5. The bottom plate 8 can move downwardly to a position shown by a dotted line from the highest reference position shown by a steady line. Each of the lock members 10 and the coupling member 11 moves downwardly to a position shown by a dotted line in accordance with the downward movement of the bottom plate 8.

Figure 2:
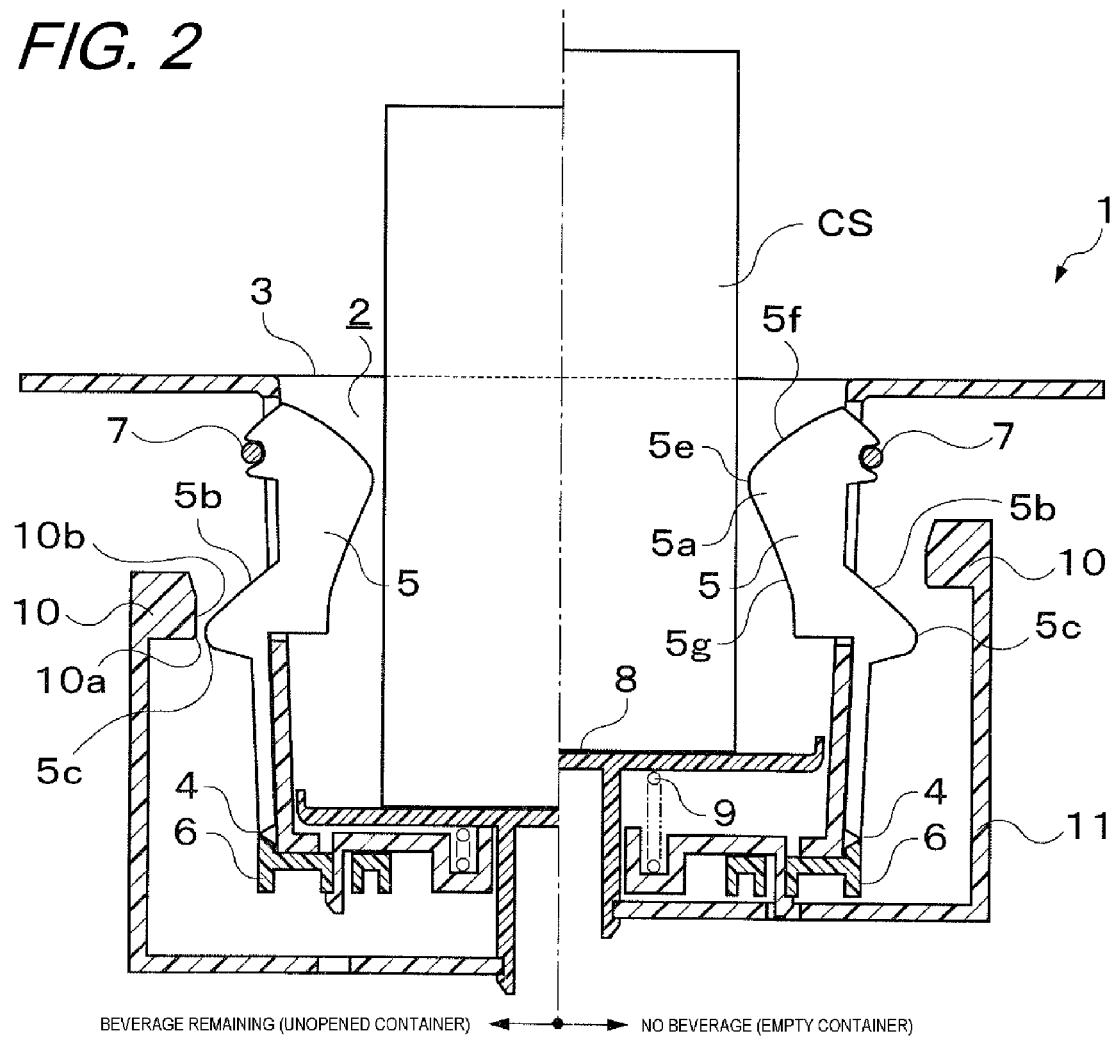
FIG. 2 is a sectional view showing a state where a beverage container of a small diameter is housed in the cup holder according to the first embodiment.
Figure 3:
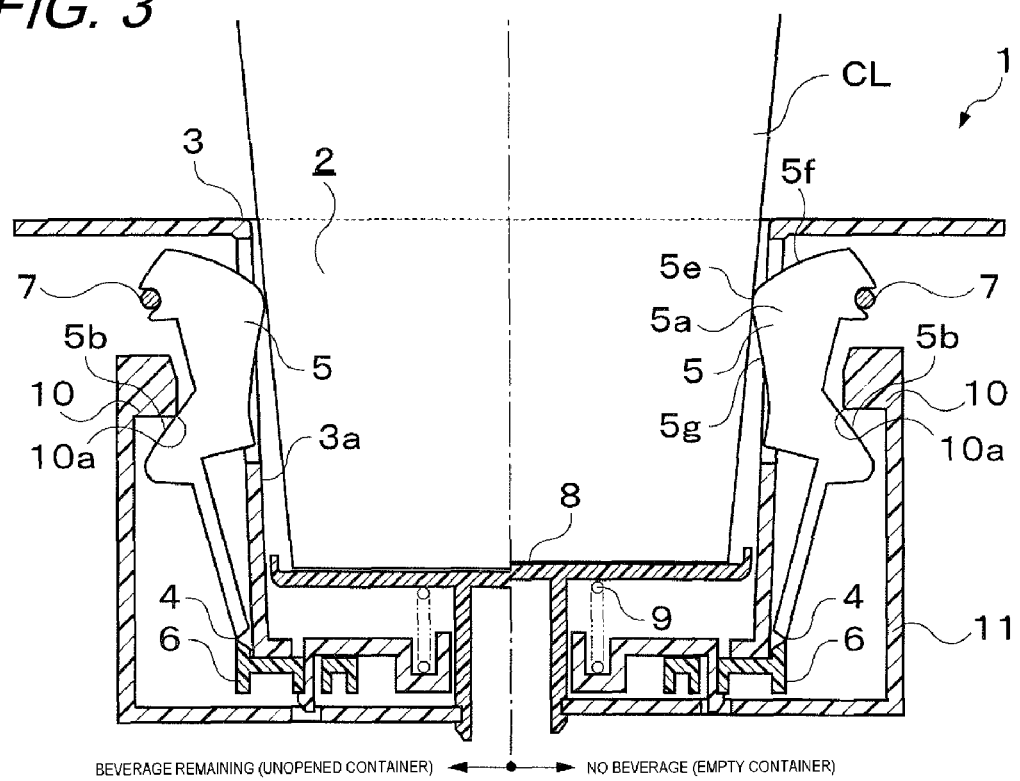
FIG. 3 is a sectional view showing a state where a beverage container of a large diameter is housed in the cup holder according to the first embodiment.
Figure 4:
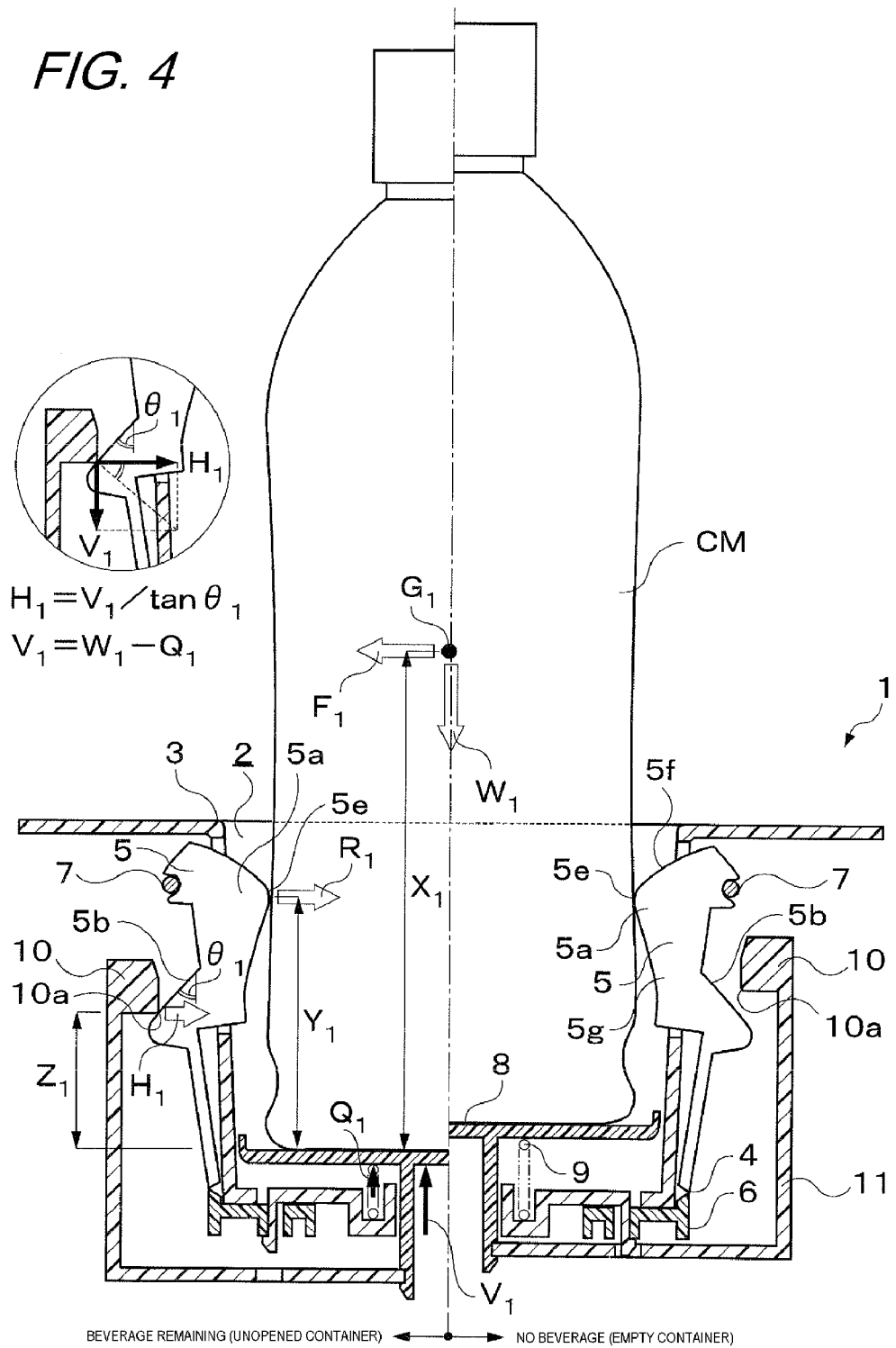
FIG. 4 is a sectional view showing a state where a beverage container of a middle diameter is housed in the cup holder according to the first embodiment.
Figure 5:
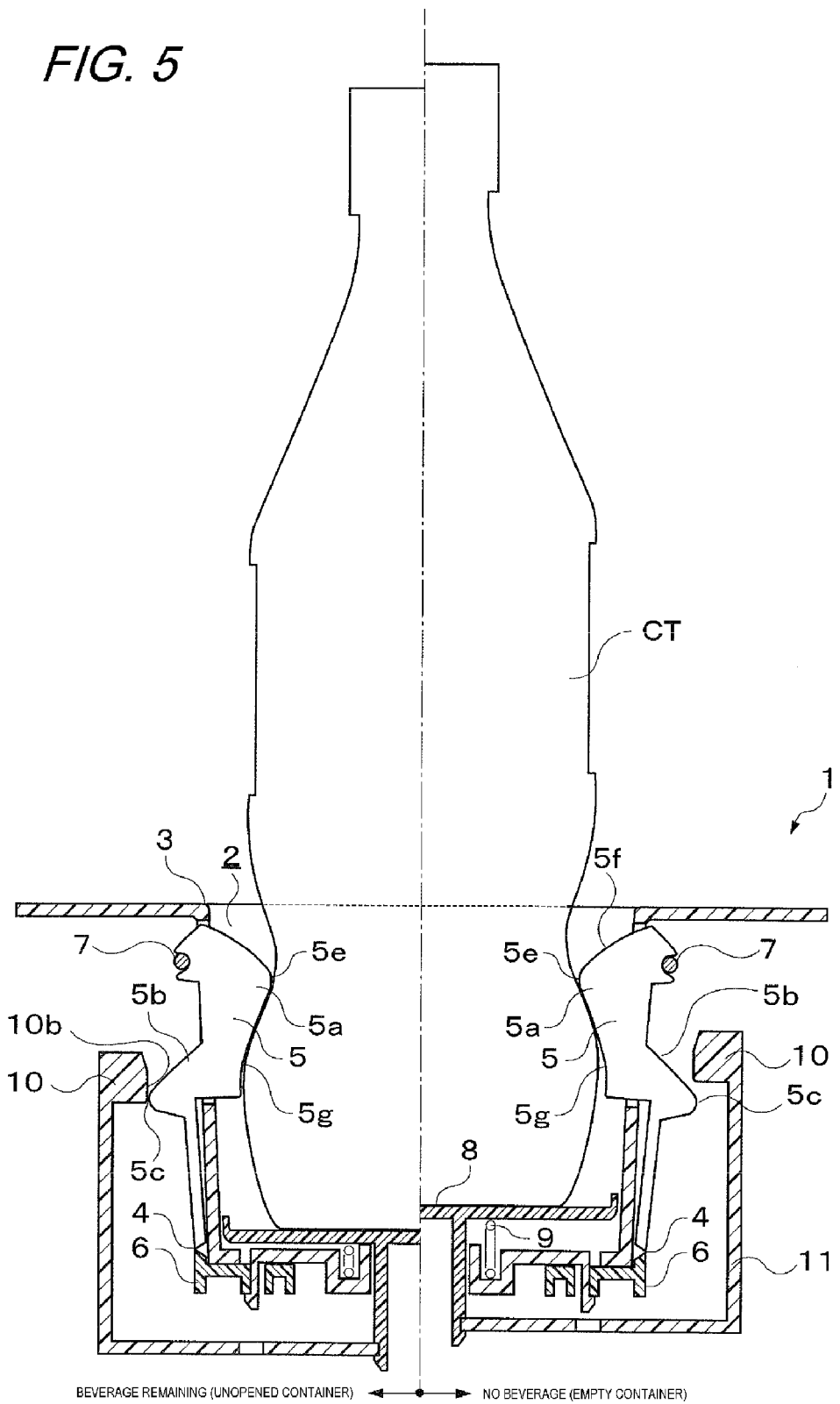
FIG. 5 is a sectional view showing a state where a beverage container having different diameters is housed in the cup holder according to the first embodiment.

The operations of the cup holder 1 will be explained with reference to sectional views of FIGS. 2 to 5 in the cases where beverage containers of various sizes are housed within the housing space 2. FIG. 2 shows a state where a beverage container CS of a small diameter is housed, FIG. 3 shows a state where a beverage container CL of a large diameter is housed, FIG. 4 shows a state where a beverage container CM of a middle diameter is housed, and FIG. 5 shows a state where a beverage container CT having different diameters is housed. In each of FIGS. 2 to 5, the sectional view of the left half side shows a state where an unopened beverage container containing the maximum or full beverage therein is housed, and the sectional view of the right half side shows a state where a beverage container containing no beverage therein is housed.

(In Case of Housing Beverage Container CS of Small Diameter)

In FIG. 2, the small-diameter beverage container CS is a can of 250 ml of the standard size having an outer diameter of about 53 mm and a height of about 133 mm. Since the distance between the apexes 5e of the abutment convex portions 5a opposing to each other via the center shaft of the cup holder 1 is slightly larger than the outer diameter of the small-diameter beverage container CS, each of the holding claws 5 does not move backwardly from the advanced reference position when the small-diameter beverage container CS is housed within the housing space 2. Thus, none of the insertion resistance at the time of inserting the small-diameter beverage container CS into the housing space 2 and the extraction resistance at the time of extracting the small-diameter beverage container CS from the housing space 2 are generated.

As shown in the sectional view of the left half side of FIG. 2, in the case where the small-diameter beverage container CS is not opened yet, since the weight (2.7 N) of the small-diameter beverage container CS is larger than the urging force (1 N) of the coil spring 9, the bottom plate 8 moves downwardly to the lowest position from the highest reference position. In this state, the abutment inner surface 10b of each of the lock members 10 locates at a height capable of abutting against the restricted vertical surface 5c of the corresponding one of the holding claws 5.

Further, as shown in the sectional view of the right half side of FIG. 2, in the case where beverage contained in the small-diameter beverage container CS becomes empty, since the urging force of the coil spring 9 becomes larger than the weight of the small-diameter beverage container CS, the bottom plate 8 moves upwardly to a position near the highest reference position.

Thus, like the cup holder of the aforesaid related art, even in the case where an acceleration in the horizontal direction according to the acceleration and the vibration of an automobile acts on the small-diameter beverage container CS, the small-diameter beverage container CS can be held stably only by the pressing forces (5 N) of the holding claws 5. Further, in the case where the small-diameter beverage container CS is not opened yet, when the small-diameter beverage container CS is forced to be fallen down to thereby slightly move the holding claw 5 backwardly from the advanced reference position, the restricted vertical surface 5c abuts against the abutment inner surface 10b of the lock member 10. Thus, the holding claw 5 is completely restricted from further moving backwardly. Therefore, even in a case where the hand etc. of a passenger touches the small-diameter beverage container CS, the small-diameter beverage container CS can be prevented from being fallen down.

(In Case of Housing Beverage Container CL of Large Diameter)

In FIG. 3, the large-diameter beverage container CL is a paper cup of 32 oz (947 ml) having the outer diameter of a bottom surface of about 72 mm and a height of about 178 mm. The outer diameter of the lower portion of the large-diameter beverage container CL is slightly smaller than the inner diameter of the side wall 3a of the cup holder main body 3. The surface of the holding claw 5 on the upper side from the apex 5e of the abutment convex portion 5a forms a slightly-expanded convex surface 5f. Thus, in the case of inserting the large-diameter beverage container CL in the housing space 2, the large-diameter beverage container CL can be inserted into the housing space 2 smoothly without contacting the outer peripheral edge of the bottom surface of the large-diameter beverage container CL with the abutment convex portion 5a. The holding claws 5 move backwardly from the advanced reference position when the large-diameter beverage container CL is housed within the housing space 2. At the time of inserting the large-diameter beverage container CL into the housing space 2 and taking out the large-diameter beverage container CL from the housing space 2, since only the pressing force (5 N) of the holding claws 5 acts as the resistance force like the cup holder of the related art, the usability almost same as the cup holder of the related art can be secured.

As shown in the sectional view of the left half side of FIG. 3, in the case where the large-diameter beverage container CL is not opened yet, since the weight (5 N) of the large-diameter beverage container CL is larger than the urging force (1 N) of the coil spring 9, the bottom plate 8 moves downwardly from the highest reference position. In this state, since the holding claws 5 are largely moved backwardly, the restricted slanted surface 5b of each of the holding claws 5 contacts with the abutment corner portion 10a of the corresponding one of the lock members 10 when the bottom plate 8 is slightly moved downwardly. Thus, since each of the holding claws 5 can not be further moved backwardly, the bottom plate 8 interlocked with the lock members 10 can not be further moved downwardly. Further, at the time of extracting the large-diameter beverage container CL from the housing space 2, since the bottom plate 8 moves upwardly, the abutment state between the restricted slanted surface 5b and the abutment corner portion 10a is released.

Further, as shown in the sectional view of the right half side of FIG. 3, in the case where beverage contained in the large-diameter beverage container CL becomes empty, since the urging force of the coil spring 9 becomes larger than the weight of the large-diameter beverage container CL, the bottom plate 8 moves upwardly to a position near the highest reference position. In this state, even if an acceleration in the horizontal direction according to the acceleration and the vibration of an automobile acts on the large-diameter beverage container CL to thereby further move the holding claws 5 backwardly, since the large-diameter beverage container CL is held by the inner surface of the side wall 3a of the cup holder main body 3, the large-diameter beverage container CL is prevented from being fallen down.

(In Case of Housing Beverage Container CM of Middle Diameter)

In FIG. 4, the middle-diameter beverage container CM is a plastic bottle of 500 ml of the standard size having an outer diameter of about 70 mm and a height of about 185 mm (height excluding a cap). When the middle-diameter beverage container CM is housed within the housing space 2, the holding claws 5 move backwardly from the advanced reference position. At the time of inserting the middle-diameter beverage container CM in the housing space 2 and extracting the middle-diameter beverage container CM from the housing space 2, since only the pressing force (5 N) of the holding claws 5 acts as the resistance force like the cup holder of the related art, the usability almost same as the cup holder of the related art can be secured.

As shown in the sectional view of the left half side of FIG. 4, in the case where the middle-diameter beverage container CM is not opened yet, since the weight (5 N) of the middle-diameter beverage container CM is larger than the urging force (1 N) of the coil spring 9, the bottom plate 8 moves downwardly from the highest reference position. In this state, since the holding claws 5 are moved backwardly, the restricted slanted surface 5b of each of the holding claws 5 contacts with the abutment corner portion 10a of the corresponding one of the lock members 10 when the bottom plate 8 moves downwardly. Further, at the time of extracting the middle-diameter beverage container CM from the housing space 2, since the bottom plate 8 moves upwardly, the abutment state between the restricted slanted surface 5b and the abutment corner portion 10a is released.

Further, as shown in the sectional view of the right half side of FIG. 4, in the case where beverage contained in the middle-diameter beverage container CM becomes empty, since the urging force of the coil spring 9 becomes larger than the weight of the middle-diameter beverage container CM, the bottom plate 8 moves upwardly to a position near the highest reference position.

As shown in the sectional view of the right half side of FIG. 4, when the middle-diameter beverage container CM is empty, an inertial force acting on the middle-diameter beverage container CM is small. Thus, even when an acceleration in the horizontal direction according to the acceleration and the vibration of an automobile acts on the middle-diameter beverage container CM, the middle-diameter beverage container CM can be held stably only by the pressing force (5 N) of the holding claws 5.

As shown in the sectional view of the left half side of FIG. 4, in the case where the middle-diameter beverage container CM is not opened yet, the backward movement of the holding claws 5 is restricted not only by the pressing force (5 N) of the holding claws 5 but also by a fact that the weight of the middle-diameter beverage container CM is transmitted to the restricted slanted surfaces 5b of the holding claws 5 from the abutment corner portions 10a of the lock members 10. Since the backward movement of the holding claws 5 is restricted, the middle-diameter beverage container CM can be held stably even when an acceleration in the horizontal direction according to the acceleration and the vibration of an automobile acts on the middle-diameter beverage container CM.

In the state shown in the sectional view of the left half side of FIG. 4, when an acceleration in the horizontal direction of 0.7 times as large as the gravitational acceleration acts on the middle-diameter beverage container CM toward the left direction in the figure, an overturning moment for falling down the middle-diameter beverage container CM and a resisting moment for preventing the falling-down of the middle-diameter beverage container CM will be as follows. Although the restoring moment due to the weight $W_1$ of the middle-diameter beverage container CM acts to reduce the overturning moment, the restoring moment will not be taken into consideration in this case as an element for considering the dangerous side.

An inertial force $F_1$ acts on the center of gravity $G_1$ of the middle-diameter beverage container CM in the horizontal and left direction and also the weight $W_1$ of the middle-diameter beverage container CM acts on the center of gravity in the vertically downward direction. In this case, the weight $W_1$ is 5 N and the inertial force $F_1$ is $0.7 \times W_1$. Further, the vertical distance $X_1$ to the center of gravity $G_1$ from the upper surface of the bottom plate 8 is 92.5 mm. Thus, the overturning moment will be $F_1 \times X_1 = 0.7 \times 5 N \times 92.5$ mm=323.75 N·mm.

The pressing force $R_1 = 5$ N of the holding claw 5 acts on the side surface of the middle-diameter beverage container CM in the horizontal and right direction. The vertical distance $Y_1$ to the apex 5e (holding point) of the abutment convex portion 5a of the holding claw 5 from the upper surface of the bottom plate 8 is 45 mm. Thus, the resisting moment due to the pressing force $R_1$ of the holding claw 5 will be $R_1 \times Y_1 = 5N \times 45$ mm=225 N·mm.

Therefore, since the overturning moment is larger than the resisting moment due to the pressing force $R_1$ of the holding claw 5, the middle-diameter beverage container CM can not be held stably only by the pressing force $R_1$ of the holding claw 5. The middle-diameter beverage container CM can be held stably by adding a resisting moment due to a pushing force $H_1$ described later to the resisting moment due to the pressing force $R_1$ of the holding claw 5.

As shown within a circle on the left side in FIG. 4, at the abutment position of the restricted slanted surface 5b with the abutment corner portion 10a of the lock member 10, a vertical load $V_1=W_1-Q_1=5N-1N=4N$ obtained by subtracting the urging force $Q_1=1N$ from the weight $W1=5N$ of the middle-diameter beverage container CM acts downwardly.

When the vertical load $V_1$ is subjected to the vector transformation in accordance with an inclination angle $\Theta_1$ of the restricted slanted surface 5b with respect to the vertical direction, there arises the pushing force $H_1$ ($=V_1/\tan\Theta_1$) for pushing the restricted slanted surface at the abutment position with the abutment corner portion 10a toward the advancing direction of the holding claw 5, that is, the horizontal and right direction in the figure.

The pushing force $H_1$ is $V_1=4N$ when the inclination angle $\Theta_1$ of the restricted slanted surface 5b with respect to the vertical direction is 45 degree. Further, a vertical direction $Z_1$ to an acting point of the pushing force $H_1$ from the upper surface of the bottom plate 8 is 25 mm. Thus, the resisting moment due to the pushing force $H_1$ is $H_1 \times Z_1 = 4N \times 25$ mm $=100$ N·mm.

As described above, the overturning moment for falling down the middle-diameter beverage container CM is 323.75 N·mm and the resisting moment for preventing the falling-down of the middle-diameter beverage container CM is 225 N·mm+100 N·mm=325 N·mm. Thus, since the overturning moment is smaller than the resisting moment, the stability of the middle-diameter beverage container CM can be maintained.

(In Case of Housing Beverage Container CT Having Different Diameters)

In FIG. 5, the beverage container CT having different diameters is a plastic bottle of 500 ml having a special side surface configuration in a manner that this container has a narrow portion at the lower part thereof and has the maximum outer diameter of about 70 mm, the outer diameter of the narrow portion of about 55 mm and a height of about 200 mm (height excluding a cap). In the case of inserting the beverage container CT into the housing space 2, the holding claws 5 mostly move backwardly from the advanced reference position when the maximum outer diameter portion of the beverage container CT passes downwardly the apexes 5e of the abutment convex portions 5a of the holding claws 5. Then, when the maximum outer diameter portion passes away downwardly the apexes 5e of the abutment convex portions 5a of the holding claws 5, the holding claws 5 gradually move forwardly within the housing space 2, whereby the abutment convex portion 5a of each of the holding claws 5 holds the narrow portion of the beverage container CT at a position where each of the holding claws 5 slightly is moved backwardly from the advanced reference position.

As shown in the sectional view of the left half side of FIG. 5, a concave surface 5g located at the lower side from the apex 5e of the abutment convex portion 5a forms a curved shape corresponding to the side surface configuration of the beverage container CT. Thus, the holding claws can hold the beverage container CT having a special side surface configuration steadily at the abutment convex portions 5a.

At the time of inserting the beverage container CT having different diameters in the housing space 2 and extracting the beverage container CT having different diameters from the housing space 2, since only the pressing force (5 N) of the holding claws 5 acts as the resistance force like the cup holder of the related art, the usability almost same as the cup holder of the related art can be secured.

As shown in the sectional view of the left half side of FIG. 5, in the case where the beverage container CT having different diameters is not opened yet, since the weight (5 N) of the beverage container CT is larger than the urging force (1 N) of the coil spring 9, the bottom plate 8 moves downwardly from the highest reference position. In this case, since an amount of the backward movement of each of the holding claws 5 from the advanced reference position is small, the bottom plate 8 can move downwardly to the lowest position from the highest reference position. In this state, the abutment inner surface 10b of each of the lock members 10 locates at a height capable of abutting against the restricted vertical surface 5c of the corresponding one of the holding claws 5. Further, at the time of extracting the beverage container CT from the housing space 2, since the lock members 10 move upwardly together with the upper movement of the bottom plate 8, the lock members 10 do not interfere the backward movement of the holding claws 5.

Further, as shown in the sectional view of the right half side of FIG. 5, when beverage contained in the beverage container CT becomes empty, since the urging force of the coil spring 9 becomes larger than the weight of the beverage container CT, the bottom plate 8 moves upwardly. In this case, since the urging force toward the downward direction applied to the beverage container CT is larger at the concave surface 5g than the apex 5e of the abutment convex portion 5a, the bottom plate 8 is prevented from moving upwardly to the poison near the highest reference position.

As shown in the sectional view of the right half side of FIG. 5, when the beverage container CT is empty, an inertial force acting on the beverage container CT is small. Thus, even when an acceleration in the horizontal direction according to the acceleration and the vibration of an automobile acts on the beverage container CT, the beverage container CT can be held stably only by the pressing force (5 N) of the holding claws 5.

As shown in the sectional view of the left half side of FIG. 5, when the beverage container CT is forced to be fallen down to thereby slightly move the holding claw 5 backwardly, the restricted vertical surface 5c abuts against the abutment inner surface 10b of the lock member 10. Thus, the holding claw 5 is completely restricted from further moving backwardly. As described above, according to the cup holder 1 of this embodiment, it is possible to stably hold the beverage container CT having different diameters which is difficult to be held due to its special side surface configuration and is likely fallen down due to its high position of the center of gravity.

(Effects of Cup Holder 1)

As described above, the backward movement of the holding claw 5 is restricted not only by the urging force of the ring spring 7 but also by the transmission of the weight of the beverage container to the restricted slanted surface 5b from the lock member 10. Thus, the beverage container can be held stably with respect to the acceleration and the vibration of an automobile without setting the urging force of the ring spring 7 so as to be larger than an urging force of an urging member provided in the cup holder of the related art.

Further, in the case where an amount of beverage within the beverage container reduces and the weight of the beverage container becomes small, an amount of load transmitted to the restricted slanted surface 5b from the lock member 10 also becomes small. In this state, since the position of the center of gravity of the beverage container becomes lower and an inertial force acting on the beverage container becomes smaller according to the weight of the beverage container, the overturning moment acting on the beverage container also becomes smaller. Thus, like the cup holder of the related art, the backward movement of the holding claw 5 can be restricted only by the urging force of the ring spring 7.

In this manner, according to the cup holder 1 of this embodiment, when the beverage container becomes empty, the beverage container can be held by the urging force of the ring spring 7. When the weight of the beverage container is larger, the pressing force of the holding claw 5 can be increased in accordance with the increase of the weight of the beverage container. Thus, the beverage containers of various sizes can be housed without increasing the resistance force at the time of inserting and taking out the beverage container. Further, the beverage container can be held stably with respect to the acceleration and vibration of an automobile irrespective of the weight of the beverage container.

Furthermore, in the case of holding the beverage container fully containing beverage therein in a state that the holding claw 5 locates at the advanced reference position or the holding claw 5 locates at a position slightly moved backwardly from the advanced reference position, when the holding claw 5 slightly moves backwardly, since the restricted vertical surface 5c abuts against the abutment inner surface 10b of the lock member 10, the holding claw 5 can be restricted from further moving backwardly.

Further, in this embodiment, since the single ring spring 7 is used as the first urging member so as to surround the four holding claws 5 entirely, the holding claws 5 are urged toward the forward direction (that is, the radially inner side of the housing space 2). Thus, since the ring spring 7 is cheaper as compared with other kinds of springs, the manufacturing cost of the cup holder 1 can be reduced. Further, the assembling procedure of the first urging member can be reduced and the productivity can be improved as compared with a case where each of the holding claws 5 is assembled with the first urging member.

Further, the cup holder according to this embodiment is configured in a manner that the four holding claws 5 raise from the base portion 6 made of resin via the hinges 4, respectively. The base portion 6, the holding claw 5 and the integral hinge 4 are integrally formed by the injection molding. Since the structure of the cup holder according to this embodiment is simple and the manufacturing thereof is easy, the manufacturing cost of the cup holder 1 can be reduced. Further, since the assembling procedure of the holding claw 5 and the integral hinge 4 is reduced, the productively can be improved.

Further, in this embodiment, since the holding claw 5 is swingable around the integral hinge 4 provided at the lower portion thereof and acting as the swingable shaft and the apex 4e of the abutment convex portion 5a of the holding claw 5 is sufficiently separated from the integral hinge 4. Thus, since the radius of the swinging operation of the apex 5e is large, the pressing force of the apex 5e is applied to the side surface of the beverage container in almost the horizontal direction. Therefore, the beverage container can be prevented from being thrown up by the pressing force. Further, since the resisting moment for preventing the falling-down of the beverage container is larger as compared with the case where the pressing force acts in the oblique direction, the beverage container can be held stably.

Second Embodiment

Figure 6:
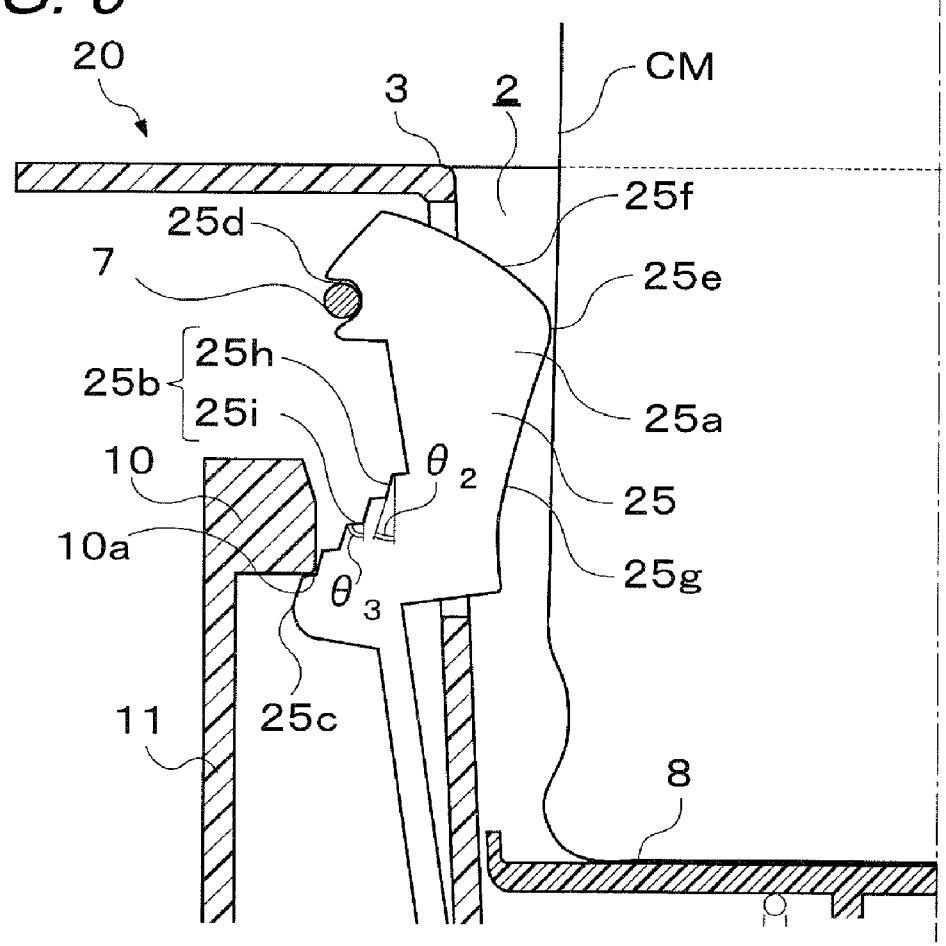
FIG. 6 is a partially sectional view for explaining a state where the middle-diameter beverage container is housed within a cup holder according to the second embodiment.

This embodiment differs from the first embodiment in a point that the structure of the holding claw 5 of the first embodiment is modified. Since the other constituent parts of this embodiment are same as those of the first embodiment, the explanation thereof will be omitted. FIG. 6 shows a partially sectional view for explaining a state where the middle-diameter beverage container CM is housed within a cup holder 20 according to this embodiment.

A holding claw 25 is made of resin and an abutment convex portion 25a formed at the upper part thereof moves into and moves out of a housing space 2. On the backward movement side at the center portion in the vertical direction of the holding claw 25, there are provided with a restricted slanted surface 25b and a restricted vertical surface 25c which abut against a lock member 10 to thereby restrict the backward movement of the holding claw 25. An attachment groove 25d for attaching a ring spring 7 therein is formed on the backward movement side at the upper portion of the holding claw 25.

Since the structures and functions of the abutment convex portion 25a and the restricted vertical surface 25c are respectively same as those of the abutment convex portion 5a and the restricted vertical surface 5c of the first embodiment, the explanation thereof will be omitted, and the explanation will be made only as to the restricted slanted surface 25b which differs in the structure and function from the restricted slanted surface 5b of the first embodiment.

The restricted slanted surface 25b has a stepwise configuration where steep slanted surfaces 25h and gentle slanted surfaces 25i are coupled continuously in an alternative manner. An inclination angle $\Theta_2$ of the steep slanted surface 25h with respect to the vertical direction is smaller than the inclination angle $\Theta_1$ of the restricted slanted surface 5b in the first embodiment. In contrast, an inclination angle $\Theta_3$ of the gentle slanted surface 25i with respect to the vertical direction is larger than the inclination angle $\Theta_1$ of the restricted slanted surface 5b in the first embodiment. An average value between the inclination angle $\Theta_2$ of the steep slanted surface 25h and the inclination angle $\Theta_3$ of the gentle slanted surface 25i is almost same as the inclination angle $\Theta_1$ of the restricted slanted surface 5b.

In this embodiment, the backward movement of the holding claw 25 is restricted when the lock member 10 abuts against the steep slanted surface 25h. In view of the fact that the pushing force $H_1$ has the relation of $H_1 = V_1/\tan \Theta_1$ in the first embodiment, a pressing force for pressing the abutment position of the steep slanted surface 25h against the abutment corner portion 10a of the lock member 10 in the horizontal direction toward the advancing direction of the holding claw 25 becomes larger as the inclination angle $\Theta_2$ of the steep slanted surface 25h becomes smaller.

Since the inclination angle $\Theta_2$ of the steep slanted surface 25h with respect to the vertical direction is smaller than the inclination angle $\Theta_1$ of the restricted slanted surface 5b in the first embodiment, this embodiment can more effectively restrict the backward movement of the holding claw 25 as compared with the first embodiment. The other effects of this embodiment is same as the first embodiment.

Third Embodiment

This embodiment differs from the first embodiment in a point that the ring 7 as the first urging member of the first embodiment is replaced by a rubber ring 37. The structure of the holding claw is slightly changed in accordance with the change of the first urging member. Since the other constituent parts of this embodiment are same as those of the first embodiment, the explanation thereof will be omitted. FIG. 7 is a plan view for explaining the structure of a cup holder 30 of this embodiment.

The rubber ring 37 is formed by coupling the both ends of a belt-shaped elastic rubber in a ring shape. The rubber ring 37 is fitted into an attachment groove 35d for attaching the rubber ring formed on the backward movement side at the upper portion of a claw 35, whereby the rubber ring is assembled with all the holding claws 35, that is, the four holding claws so as to surround all the holding claws 35 from the backward movement side thereof. The attachment groove 35d of the holding claw 35 is configured in a rectangular concave shape so as to match to the shape of the rubber ring 37. In a non-use state where no beverage container is housed in the housing space 2, the holding claws 35 are urged by the rubber ring 37 to the advanced reference position where the holding claws 35 are mostly advanced into the housing space 2. When a beverage container is housed in the housing space 2, the holding claws 35 are pushed toward the radial outer side in the housing space 2 by the side surface of the beverage container. Thus, the holding claws 35 move backwardly against the urging force of the rubber ring 37, whereby a pressing force of 5 N acts on the side surface of the beverage container via the holding claws 35 by the urging force of the rubber ring 37.

When a beverage container of the maximum diameter is housed within the housing space 2, each of the holding claws 35 swingably moves backwardly to a position shown by a dotted line from the advanced reference position shown by a steady line. In accordance with the backward movement of the holding claws 35, the rubber ring 37 is expanded to a shape of a rubber ring 37' shown by a dotted line.

According to the configuration of this embodiment, since all the four holding claws 35 are surrounded by the single rubber ring 37, the holding claws 35 are urged in the forward direction. The rubber ring 37 is cheap and easy in the assembling procedure as compared with the ring spring 7 of the first embodiment. Thus, this embodiment attributes to the reduction of the manufacturing cost and the improvement of the productivity.

In the case of using the ring spring 7 as the first urging member like the first embodiment, since the portion of the ring spring 7 between the adjacent holding claws 5 expands in a circular shape toward the radial outer side of the housing space 2, the expanded portion of the ring spring 7 may impede the procedure of disposing the cup holder 1 in the narrow space. On the contrary, according to this embodiment, in the case where the rubber ring 37 is used as the first urging member, the adjacent holding claws 35 are coupled by the rubber ring 37 in a straight manner with the shortest distance. Thus, since a portion of the rubber ring 37 between the adjacent holding claws 35 does not expand toward the radial outer side of the housing space 2, the cup holder 30 can be easily disposed in the narrow space. The other effects of this embodiment is same as the first embodiment.

Fourth Embodiment

Figure 8A:
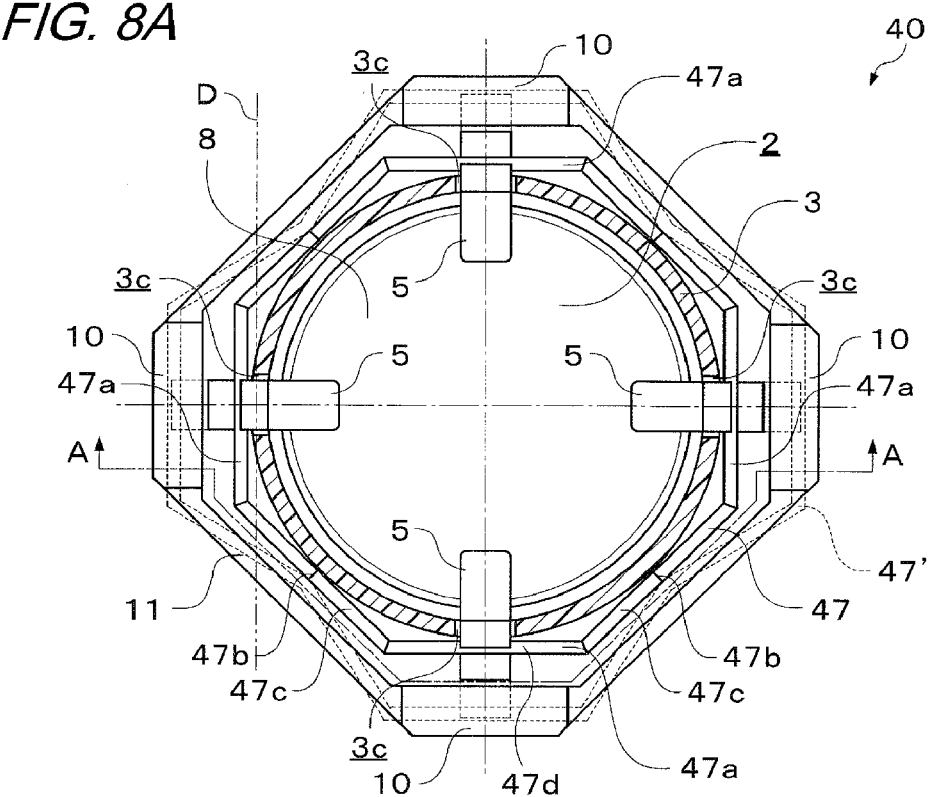
Figure 8B:
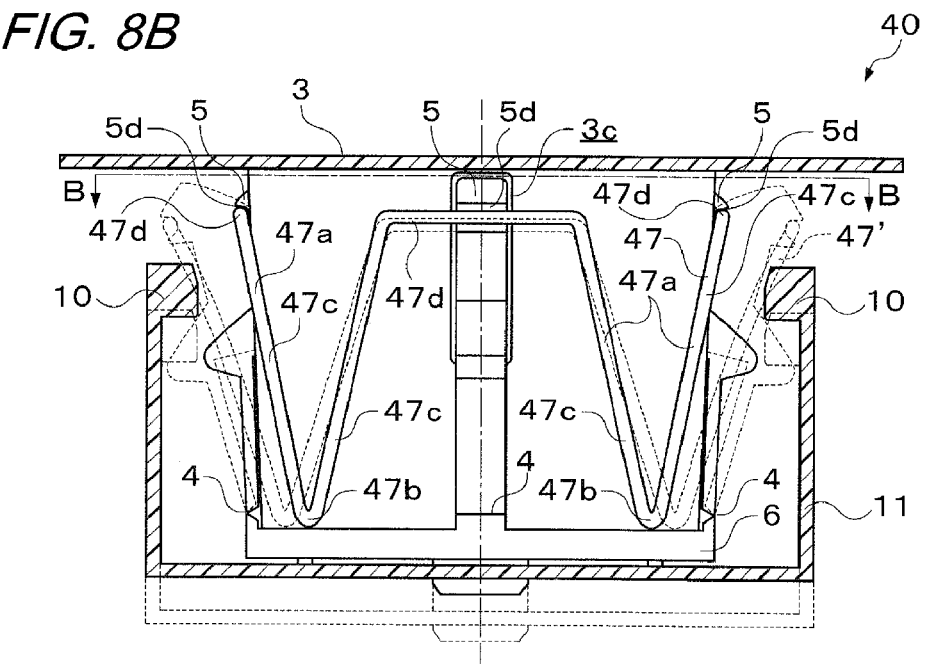

This embodiment differs from the first embodiment in a point that the ring 7 as the first urging member of the first embodiment is replaced by a rubber ring 37. Since the other constituent parts of this embodiment are same as those of the first embodiment, the explanation thereof will be omitted. FIGS. 8A and 8B show the structure of a cup holder according to this embodiment. FIG. 8A is a sectional view of the cup holder cut along a line B-B in FIG. 8B and FIG. 8B is a sectional view of the cup holder cut along a line A-A in FIG. 8A. Dotted lines in FIGS. 8A and 8B show the maximum movable ranges of respective components constituting the cup holder 40.

A polygonal ring 47 is formed in a manner that a music wire is bent in a three-dimensional polygonal shape and both ends of the music wire are coupled to each other by the welding so as to be an endless member. The polygonal ring 47 is provided with four torsion spring portions 47a which number is same as the holding claws 5.

The torsion spring portion 47a is configured by two bent portions 47b, 47b each having almost the same height as the integral hinge 4 and disposed respectively on the both sides of the integral hinge 4, two arm portions 47c, 47c each having the same length and respectively extending upwardly from the bent portions 47b, 47b, and an apex portion 47d for coupling the tip ends of the arm portions 47c, 47c in the horizontal direction, whereby the torsion spring is formed in an almost U-shape. The bent portion 47b is shared by the adjacent torsion spring portions 47a and so the adjacent torsion springs are coupled by the common bent portion. In other words, the arm portions 47c, 47c of the adjacent torsion spring portions 47a, 47a are extended upwardly from the both ends of the common bent portion 47a so as to form a V-shape as a whole.

The polygonal ring 47 is formed as a flat plane area, in a plan view, surrounded by the four apex portions 47d, 47d, 47d, 47d and four lines each for coupling the end portions of the adjacent apex portions 47d, 47d with the shortest distance. That is, the bent portions 47b and the arm portions 47c are disposed within this flat plan area in the plan view. The polygonal ring 47 is assembled with all the holding claws, that is, the four holding claws 5 so as to surround all the holding claws 5 from the backward movement side thereof. The four apex portions 47d are attached into attachment grooves 5d formed on the backward movement sides of the four holding claws 5, respectively.

The respective bent portions 47b of the polygonal ring 47 are supported by the upper surface of the base portion 6 with which the four holding claws 5 are integrally formed. Although the lower movement of each of the bent portions 47b is restricted by the upper surface of the base portion 6, the movement in the horizontal direction thereof is not restricted.

When the apex portion 47d of the torsion spring portion 47a is pushed toward the backward movement side of the holding claw 5, each of the arm portions 47c, 47c swings toward the swinging direction of the holding claw 5. Thus, since each of the arm portions 47c, 47c and/or each of the bent portions 47b, 47b are twisted, an elastic force for restoring the apex portion 47d on the forward movement direction side of the holding claw 5 is generated at each of the arm portions 47c, 47c and/or each of the bent portions 47b, 47b. This elastic force acts as an urging force for urging the holding claw 5 toward the forward movement direction.

In a non-use state where no beverage container is housed in the housing space 2, the holding claws 5 are urged by the torsion spring portions 47a of the polygonal ring 47 to the advanced reference position where the holding claws 5 are mostly advanced into the housing space 2. When a beverage container is housed in the housing space 2, the holding claws 5 are pushed toward the radial outer side in the housing space 2 by the side surface of the beverage container. Thus, the holding claws 5 move backwardly against the urging force of the torsion spring portions 47a, whereby a pressing force of 5 N acts on the side surface of the beverage container via the holding claws 5 by the urging force of the torsion spring portions 47a.

When a beverage container of the maximum diameter is housed within the housing space 2, each of the holding claws 5 swingably moves backwardly to a position shown by a dotted line from the advanced reference position shown by a steady line. In accordance with the backward movement of the holding claws 5, the apex portion 47d of each of the torsion spring portions 47a of the polygonal ring 47 is pushed toward the radial outer side of the housing space 2, whereby the polygonal ring 47 is deformed to a shape of a polygonal ring 47' shown by a dotted line.

In this case, since the apex portion 47d of each of the torsion spring portions 47a is pushed on the backward movement side of the holding claw 5, the respective arm portions 47c, 47c of the torsion spring portion 47a swing toward the swinging direction of the holding claw 5 to thereby bend the respective arm portions 47c, 47c. Further, the bent angle of each of the bent portions 47b, 47b becomes large. Since each of the bent portions 47b, 47b is not close to the axial line D of the integral hinge 4, the radius of the swinging operation of each of the arm portions 47c, 47c differs from the radius of the swinging operation of the groove 5d of the holding claw 5. Accordingly, as shown in FIGS. 8A and 8B, each of the bent portions 47b, 47b slidably moves on the upper surface of the base portion 6 toward the radial outer side of the housing space 2. In FIG. 8A, only one axial line D is shown among the four axial lines of the hinges 4.

According to the configuration of this embodiment, the polygonal ring 47 is used as the first urging member and all the four holding claws 5 are surrounded by the single polygonal ring 47 to thereby urge the holding claws 5 toward the advancing direction. Thus, since the polygonal ring 47 is cheaper as compared with other kinds of springs, the manufacturing cost of the cup holder 40 can be reduced. Further, the assembling procedure of the first urging member can be reduced and the productivity can be improved as compared with a case where each of the holding claws 5 is assembled with the first urging member.

Further, since the polygonal ring 47 is formed by the music wire, the durability thereof is excellent. Further, since the polygonal ring 47 is formed not in a circular shape but in the polygonal shape where the expansion degree is suppressed, in a plan view, this polygonal ring is effective for saving the space like the rubber ring 37 of the third embodiment. Furthermore, since the polygonal ring 47 has the torsion spring portions 47a which are provided independently and which number is same as the holding claws 5, it is possible to uniformize the urging forces acting on the respective holding claws 5. The other effects of this embodiment is same as the first embodiment.

Fifth Embodiment

Figure 9A:
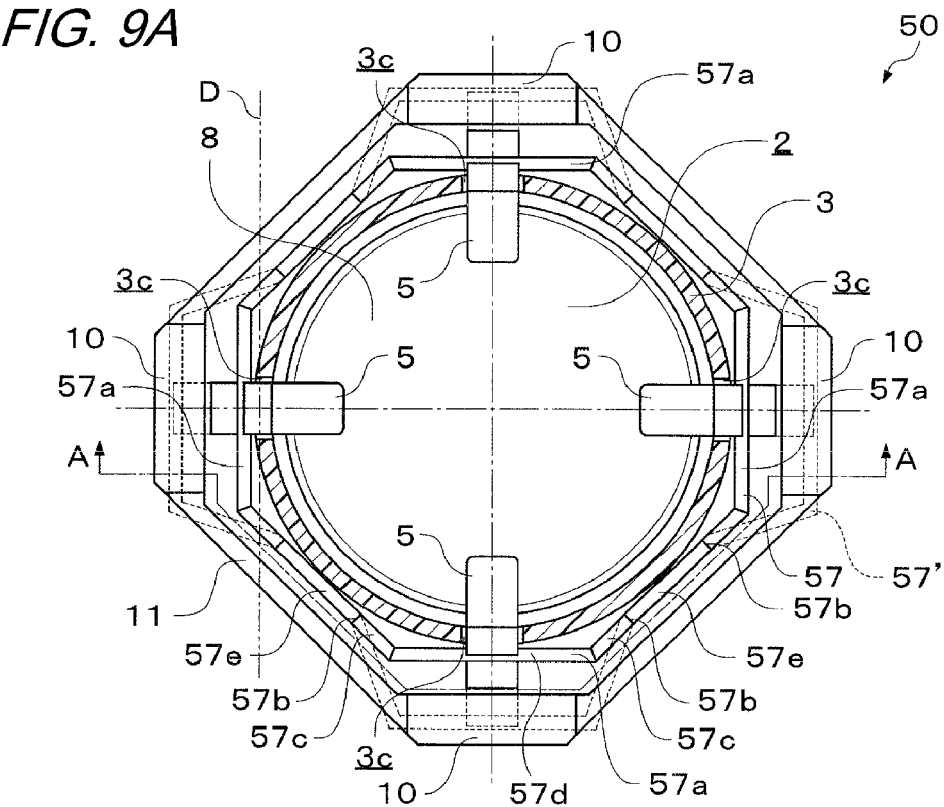
Figure 9B:
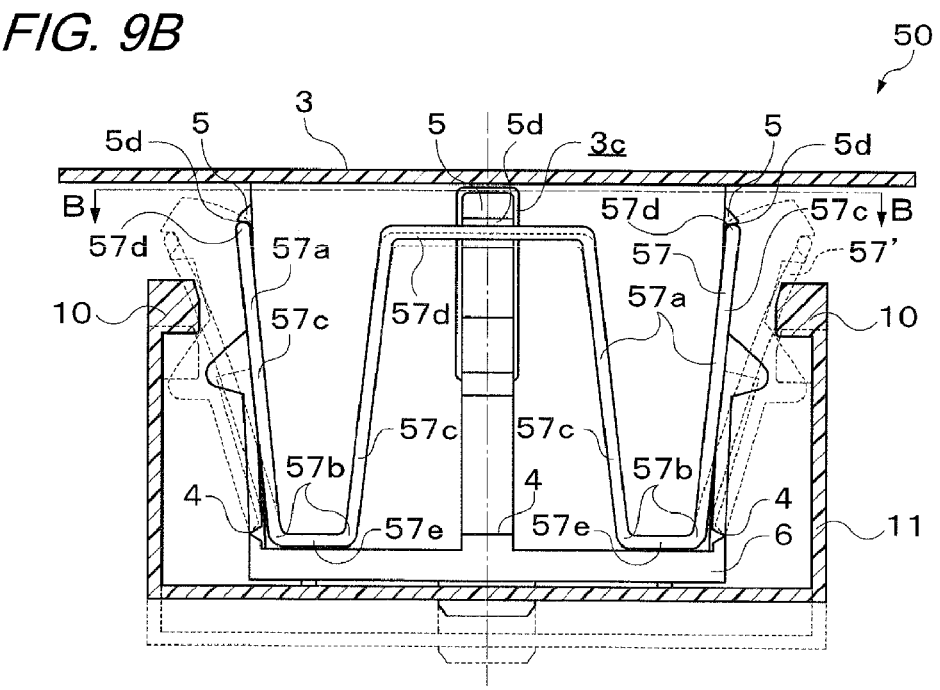
Figure 10:
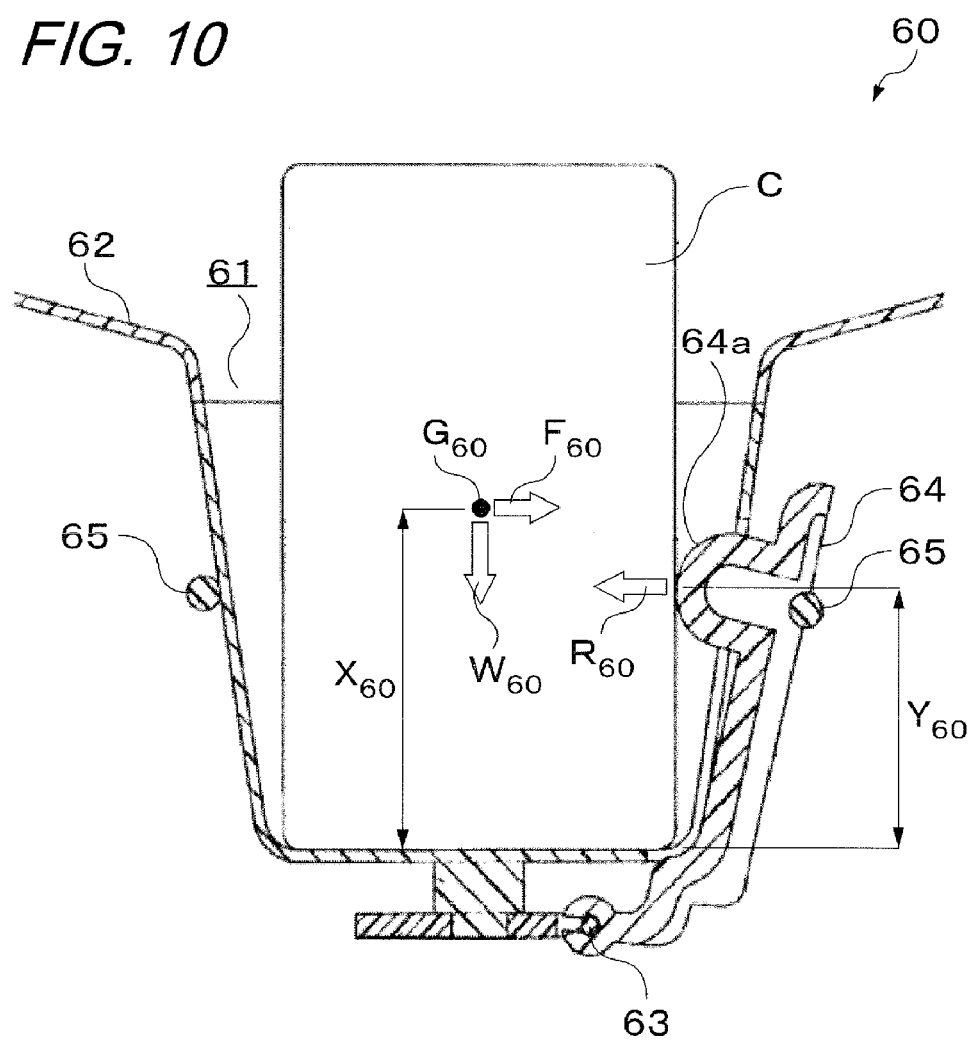
FIG. 10 is a sectional view showing a state where a beverage container is housed in a cup holder of the related art.

This embodiment differs from the fourth embodiment in a point that the shape of the polygonal ring 47 as the first urging member of the fourth embodiment is modified as another polygonal ring 57. Since the other constituent parts of this embodiment are same as those of the first embodiment, the explanation thereof will be omitted. FIGS. 9A and 9B show the structure of a cup holder according to this embodiment. FIG. 9A is a sectional view of the cup holder cut along a line B-B in FIG. 9B and FIG. 9B is a sectional view of the cup holder cut along a line A-A in FIG. 9A. Dotted lines in FIGS. 9A and 9B show the maximum movable ranges of respective components constituting the cup holder 50.

A polygonal ring 57 is formed in a manner that a music wire is bent in a three-dimensional polygonal shape and both ends of the music wire are coupled to each other by the welding so as to be an endless member. The polygonal ring 57 is provided with four torsion spring portions 57a which number is same as the holding claws 5.

The torsion spring portion 57a is configured by two bent portions 57b, 57b each having almost the same height as the hinge 5 and disposed respectively on the both sides of the integral hinge 4 in the vicinity of the axial line D of the integral hinge 4, two arm portions 57c, 57c each having the same length and respectively extending upwardly from the bent portions 57b, 57b, and an apex portion 57d for coupling the tip ends of the arm portions 57c, 57c in the horizontal direction, whereby the torsion spring is formed in an almost U-shape. The bent portions 57b, 57b of the adjacent torsion spring portions 57a are coupled by a coupling portion 57e. In FIG. 9A, only one axial line D is shown among the four axial lines of the hinges 4.

The polygonal ring 57 is formed as a flat plane area, in a plan view, configured by the four apex portions 57d, 57d, 57d, 57d and four lines each for coupling the end portions of the adjacent apex portions 57d, 57d with the shortest distance. That is, the bent portions 57b, the arm portions 57c and the coupling portions 57e are disposed within this flat plan area in the plan view. The polygonal ring 57 is assembled with all the holding claws, that is, the four holding claws 5 so as to surround all the holding claws 5 from the backward movement side thereof. The four apex portions 57d are attached into attachment grooves 5d formed on the backward movement sides of the four holding claws 5, respectively.

The respective bent portions 57b of the polygonal ring 57 are supported by the upper surface of the base portion 6 with which the four holding claws 5 are integrally formed. Although the lower movement of each of the bent portions 57b is restricted by the upper surface of the base portion 6, the movement in the horizontal direction thereof is not restricted.

Like the fourth embodiment, when the apex portion 57d of the torsion spring portion 57a is pushed toward the backward movement side of the holding claw 5, each of the arm portions 57c, 57c swings toward the swinging direction of the holding claw 5. Thus, since each of the arm portions 57c, 57c and/or each of the bent portions 57b, 57b are twisted, an elastic force for restoring the apex portion 57d on the forward movement direction side of the holding claw 5 is generated at each of the arm portions 57c, 57c and/or each of the bent portions 57b, 57b. This elastic force acts as an urging force for urging the holding claw 5 toward the forward movement direction.

In a non-use state where no beverage container is housed in the housing space 2, the holding claws 5 are urged by the torsion spring portions 57a of the polygonal ring 57 to the advanced reference position where the holding claws 5 are mostly advanced into the housing space 2. When a beverage container is housed in the housing space 2, the holding claws 5 are pushed toward the radial outer side in the housing space 2 by the side surface of the beverage container. Thus, the holding claws 5 move backwardly against the urging force of the torsion spring portions 57a, whereby a pressing force of 5 N acts on the side surface of the beverage container via the holding claws 5 by the urging force of the torsion spring portions 57a.

When a beverage container of the maximum diameter is housed within the housing space 2, each of the holding claws 5 swingably moves backwardly to a position shown by a dotted line from the advanced reference position shown by a steady line. In accordance with the backward movement of the holding claws 5, the apex portion 57d of each of the torsion spring portions 57a of the polygonal ring 57 is pushed toward the circumferential outer direction of the housing space 2, whereby the polygonal ring 57 is deformed to a shape of a polygonal ring 57' shown by a dotted line.

In this case, since the apex portion 57d of each of the torsion spring portions 57a is pushed on the backward movement side of the holding claw 5, the respective arm portions 57c, 57c of the torsion spring portion 57a swing toward the swinging direction of the holding claw 5 to thereby bend the respective arm portions 57c, 57c. Further, the bent angle of each of the bent portions 57b, 57b becomes large. Since each of the bent portions 57b, 57b is disposed near the axial line D of the integral hinge 4, the radius of the swinging operation of each of the arm portions 57c, 57c is almost same as the radius of the swinging operation of the groove 5d of the holding claw 5. Accordingly, the movement of each of the bent portions 57b, 57b differs from the movement of each of the bent portions 47b, 47b of the fourth embodiment. That is, as shown in FIGS. 9A and 9B, a moving distance of each of the bent portions 57b, 57b on the upper surface of the base portion 6 is quite small.

According to this embodiment thus configured, in the case where each of the arm portions 57c, 57c of the torsion spring portion 57a swings in accordance with the backward movement of the holding claw 5, a moving distance of each of the bent portions 57b, 57b on the upper surface of the base portion 6 is quite small. Thus, the transmission of a stress between the adjacent torsion spring portions 57a is interrupted sufficiently by the coupling portion 57e. Thus, the polygonal ring 57 can more effectively uniformize the urging force acting on each of the holding claws 5 as compared with the polygonal ring 47 of the fourth embodiment. The other effects of this embodiment are same as the fourth embodiment.

The cup holder according to the invention is not limited to those of the first to fifth embodiments and, of course, can be implemented within a range not departing from the gist of the invention in various modes modified or improved by those skilled in the art.

DESCRIPTION OF THE REFERENCE NUMERALS AND SIGNS 1 cup holder
2 housing space
3 holder mail body
4 integral hinge (hinge portion)
5 holding claw
5b restricted slanted surface
5c restricted vertical surface
7 ring spring (first urging member)
8 bottom plate
9 coil spring (second urging member)
10 lock member
10b abutment inner surface
11 coupling member
20 cup holder
25 holding claw
25b restricted slanted surface
25c restricted vertical surface
25h steep slanted surface
25i gentle slanted surface
30 cup holder
35 holding claw
37, 37' rubber ring (first urging member)
40 cup holder
47, 47' polygonal ring (first urging member)
47a torsion spring portion
47b bent portion
47c arm portion
47d apex portion
50 cup holder
57, 57' polygonal ring (first urging member)
57a torsion spring portion
57b bent portion
57c arm portion
57d apex portion

What is claimed is:

1. A cup holder comprising:
a holder main body which has a bottom portion and has a housing space for housing a beverage container therein;
a holding claw which is swingable around a hinge portion as a swingable shaft provided at a lower portion of the holding claw, an upper portion of the holding claw moving into and out of the housing space;
a first urging member which urges each of the holding claws to a direction where the holding claw moves forwardly;
a bottom plate which is disposed at a lower portion of the housing space so as to be vertically movable;
a second urging member which urges the bottom plate to a direction where the bottom plate moves upwardly;
a lock member which contacts with and separates from a restricted slanted surface formed on a backward movement side of the holding claw, the lock member restricting the backward movement of the holding claw at a time of abutting against the restricted slanted surface; and
a coupling member which transmits a vertical movement of the bottom plate to the lock member, wherein
the restricted slanted surface inclines downwardly on the backward movement side of the holding claw, wherein
in a non-use state where no beverage container is housed in the housing space, the holding claws is urged by the first urging member to an advanced reference position where the holding claw is mostly advanced into the housing space, the bottom plate is urged to a highest reference position where the bottom plate is mostly moved upwardly, and the lock member locates at a portion separated from the restricted slanted surface above the restricted slanted surface, and wherein
when a beverage container is housed in the housing space, the holding claw is pushed by a side surface of the beverage container to thereby move backwardly against an urging force of the first urging member and, simultaneously, the bottom plate moves downwardly against an urging force of the second urging member since a weight of the beverage container is applied to the bottom plate to thereby move the lock member downwardly in an interlocked manner with the downward movement of the bottom plate, whereby since the restricted slanted surface abuts against the lock member, the weight of the beverage container is transmitted to the restricted slanted surface from the lock member to thereby restrict the backward movement of the holding claw.

2. The cup holder according to claim 1, wherein the restricted slanted surface has a stepwise configuration where steep slanted surfaces and gentle slanted surfaces are coupled continuously in an alternative manner, and the backward movement of the holding claw is restricted when the lock member abuts against the restricted slanted surface.

3. The cup holder according to claim 1, wherein a restricted vertical surface having a vertical or substantially vertical surface is formed beneath the backward movement side of the restricted slanted surface, and the abutment inner surface of the lock member locates at a height capable of abutting against the restricted vertical surface of the holding claw urged to the advanced reference position in a state where the lock member is mostly moved downwardly.

4. The cup holder according to claim 1, wherein the first urging member is a ring spring which is formed in a C-shape by subjecting a steel wire to a bending process, and wherein a plurality of holding claws are provided so as to surround the beverage container housed in the housing space from a circumferential direction thereof and the ring spring is assembled so as to surround all the plurality of holding claws from the backward movement side of the holding claws.

5. The cup holder according to claim 1, wherein the first urging member is an elastic rubber ring of an annular shape, and wherein a plurality of holding claws are provided so as to surround the beverage container housed in the housing space from a circumferential direction thereof and the rubber ring is assembled so as to surround all the plurality of holding claws from the backward movement side of the holding claws.

6. The cup holder according to claim 1, wherein
a plurality of holding claws are provided so as to surround the beverage container housed in the housing space from a circumferential direction thereof, wherein
the first urging member is a polygonal ring which is formed in a polygonal shape by subjecting a steel wire to a bending process so as to have torsion spring portions which number is same as the holding claws, wherein
each of the torsion spring portions is configured by two bent portions each having substantially same height as the hinge portion and disposed respectively on both sides of the hinge portion, two arm portions respectively extending upwardly from the bent portions, and an apex portion for coupling tip ends of the arm portions, wherein
the polygonal ring is formed as a flat plane area, in a plan view, surrounded by the apex portions and lines each for coupling end portions of the adjacent apex portions with a shortest distance, the polygonal ring being assembled with all the holding claws in a manner that the apex portions respectively abut against the backward movement sides of the holding claws, and wherein
when the apex portion of the torsion spring portion is pushed toward the backward movement side of the holding claw, each of the arm portions swings toward the swinging direction of the holding claw, whereby since each of the arm portions and/or each of the bent portions are twisted, an elastic force for restoring the apex portion is generated at each of the arm portions and/or each of the bent portions on the forward movement direction side of the holding claw.

7. The cup holder according to claim 1, wherein the holding claw is made of resin and the hinge portion of the holding claw is an integral hinge.

* * * * *